United States Patent
Allasia et al.

(10) Patent No.: US 8,553,534 B2
(45) Date of Patent: Oct. 8, 2013

(54) PROTECTING AN ETHERNET NETWORK HAVING A RING ARCHITECTURE

(75) Inventors: Andrea Allasia, Turin (IT); Marco Schiano, Turin (IT); Laura Serra, Turin (IT); Luigi Varetto, Turin (IT)

(73) Assignee: Telecom Italia S.p.A., Milan (IT)

(*) Notice: Subject to any disclaimer, the term of this patent is extended or adjusted under 35 U.S.C. 154(b) by 440 days.

(21) Appl. No.: 12/809,870

(22) PCT Filed: Dec. 21, 2007

(86) PCT No.: PCT/EP2007/064505
§ 371 (c)(1),
(2), (4) Date: Jun. 21, 2010

(87) PCT Pub. No.: WO2009/080124
PCT Pub. Date: Jul. 2, 2009

(65) Prior Publication Data
US 2010/0271935 A1    Oct. 28, 2010

(51) Int. Cl.
*H04L 12/26* (2006.01)
*H04L 12/437* (2006.01)

(52) U.S. Cl.
CPC .................................. *H04L 12/437* (2013.01)
USPC ............ 370/222; 370/216; 370/217; 370/221; 370/224; 370/228; 370/257; 370/258; 370/364; 370/365; 370/403; 370/420; 370/421; 398/1; 398/2; 398/3; 398/4; 398/5; 398/10; 398/15; 398/17; 398/30; 398/43; 398/59

(58) Field of Classification Search
None
See application file for complete search history.

(56) References Cited

U.S. PATENT DOCUMENTS 5,461,608 A    10/1995  Yoshiyama
6,111,853 A *   8/2000  Goodman ..................... 370/224

(Continued)

FOREIGN PATENT DOCUMENTS

| EP | 1768318 A1 | 3/2007 |
|---|---|---|
| WO | 96/19884 A1 | 6/1996 |
| WO | 2004/028052 A1 | 4/2004 |
| WO | 2006/030435 A1 | 3/2006 |
| WO | 2007/073761 A1 | 7/2007 |

OTHER PUBLICATIONS

International Search Report and Written Opinion dtd Sep. 10, 2008, PCT/EP2007/064505.

(Continued)

*Primary Examiner* — Faruk Hamza
*Assistant Examiner* — Aixa A Guadalupe-Cruz
(74) *Attorney, Agent, or Firm* — Banner & Witcoff, Ltd.

(57) ABSTRACT

Delivering multicast data traffic over a communication network includes a first network node delivering multicast data traffic to second network nodes. The first and second network nodes are connected by a transmission network in a ring architecture and implement a point-to-multipoint layer 2 protocol. A method includes at the first network node: collecting alarms signals indicative of a failure along the whole ring and of the second network nodes. Based on a current state of the alarm signals, delivering the multicast data traffic either in a first delivery direction along the ring, or in a second delivery direction along the ring opposite to the first delivery direction, or in both the first and second delivery directions. At each of the second network nodes: collecting alarm signals indicative of a failure of the transmission network locally to the second network node and of the second network node. Based on a current state of the local alarm signals either receiving the multicast data traffic delivered by the first network node from the first direction, forwarding the multicast data traffic in the first direction and transmitting local data traffic to the first network node along the second delivery direction, or receiving the data traffic delivered by the first network node from the second direction, forwarding the multicast data traffic in the second direction and transmitting the local data traffic to the first network node along the first delivery direction.

19 Claims, 12 Drawing Sheets

(56) References Cited

U.S. PATENT DOCUMENTS

| 6,623,186 | B2 | 9/2003 | Rumer |
| 6,785,226 | B1* | 8/2004 | Oltman et al. ............... 370/228 |
| 7,355,965 | B2* | 4/2008 | Griswold et al. ............ 370/216 |
| 7,773,877 | B2* | 8/2010 | Yang et al. .................... 398/10 |
| 2004/0111606 | A1 | 6/2004 | Wong et al. |
| 2004/0213564 | A1 | 10/2004 | Sakano et al. |
| 2007/0264011 | A1 | 11/2007 | Sone et al. |

OTHER PUBLICATIONS

Vissers, M., Alcatel Sel De, "Draft new Recommendation G.8.08.1 (for consent); TD 46", ITU-T Draft Study Period 2001-2004, Study Group 15, Oct. 21, 2003, pp. 1-65.

Shah, M., et al., "Extreme Networks' Ethernet Automatic Protection Switching (EAPS) Ver. 1", RFC 3619, Oct. 1, 2003, pp. 1-16.

* cited by examiner

PROTECTING AN ETHERNET NETWORK HAVING A RING ARCHITECTURE

CROSS REFERENCE TO RELATED APPLICATIONS

This is a U.S. National Phase Application under 35 U.S.C. §371 of International Application No. PCT/EP2007/064505 filed Dec. 21, 2007, which was published Under PCT Article 21(2), the entire contents of which are incorporated herein by reference.

BACKGROUND OF THE INVENTION

The present invention generally relates to the field of data communications networks, and particularly to Ethernet networks. Specifically, the invention concerns the protection of an Ethernet network having a ring architecture.

DESCRIPTION OF THE RELATED ART

Nowadays, Ethernet represents the most successful and widely installed Local Area Network (LAN) technology, and is progressively becoming the elected switching technology also in Metropolitan Area Networks (MAN). In MANs, Ethernet technology can be used either as a pure layer-2 transport mechanism (layer-2 means the second layer—data link layer—of the Open System Interconnect—OSI—seven layers basic reference model), or for offering VPN (Virtual Private Network) services, or also as a broadband technology for the delivery of new services for residential and business customers.

The expected growth of bandwidth-intensive "triple play" services (i.e., the provisioning of two broadband services, high-speed Internet access and television, and one narrow-band service, telephone, over a single broadband connection) and symmetrical (downlink and uplink) bandwidth connections for relatively big business customers in the future can be handled effectively with an all-Ethernet-based access and aggregation infrastructure, to be combined with high-performance access devices for allowing the handling of the traffic with the quality specific of the considered services. Ethernet also enables the carriers (companies that provide communications and networking services) to cut the costs for capital and operational expenditures.

These so-called "carrier-grade" Ethernet networks lay the foundation for a flexible and cost-effective next generation networking solution, offering the opportunity for the carriers to participate in growing markets offering flexible and highly reliable broadband services to residential and business customers.

One of the major requirements for the development of Ethernet into the carriers' domain is reliability, which is achieved through network resilience and protection techniques. However, given its origin as a LAN technology, for point-to-point communications, at present Ethernet suffers from at least the following limitations in presence of network faults:

slow failure recovery: link failures (breaks) in an Ethernet network are normally handled by so-called "spanning tree" algorithms, which including the "rapid spanning tree" algorithm: in presence of faults, these algorithms may need some seconds to converge, depending on the complexity of the network; such a time scale is not acceptable for MAN applications;

recovery time dependency on network complexity: spanning tree and rapid spanning tree algorithms convergence time strongly depends on the number of network nodes, on the network topology and on the network node processors' computation speed;

lack of a specific protection technique for multicast traffic: protection techniques like link aggregation can quickly protect the traffic from one source node to one destination node (point-to-point), but are not suitable for point-to-multipoint connections, and a protection scheme for multicast traffic is not yet available.

In particular, the last limitation has a strong impact on the possibility of exploiting Ethernet technology in MANs, where the most common traffic distribution configuration is "hub-spoke" (i.e., a configuration where a master node, the hub, distributes and collects the traffic from all the other nodes, the spokes, while there is no direct traffic exchange between the spokes).

The typical architecture of a metropolitan Ethernet network is composed of a number of Ethernet equipments, connected in a ring topology by means of a WDM (Wireless Division Multiplex) transmission system. The Ethernet equipments comprise access equipments (the spokes) devoted to traffic distribution to customers, either with direct connections (for big business customers) or by means of other access equipments (like DSLAMs—Digital Subscriber Line Access Multiplexers), as for residential customers. A hub Ethernet equipment is devoted to traffic concentration and distribution and, in general, is connected to one or more service platforms.

The DSLAMs may be directly connected to the hub Ethernet equipment by means of Gigabit Ethernet (GE) WDM transmission channels; a typical networking solution consists in the allocation of one GE channel for the connection of each DSLAM to the hub Ethernet equipment.

This kind of network architecture is robust against nodes and links failures. The ring topology guarantees two separate transmission paths between each pair of nodes: the transmission path operating in clockwise direction and the transmission path operating in counter-clockwise direction.

The protection functions, which govern traffic switching between the default working path and the protection path in case of fault, can be provided either by the WDM transmission systems, by means of known techniques like SNCP (SubNetwork Connection Protection), or by the Ethernet equipments.

The traffic carried by such a network is basically of two kinds:

unicast traffic: the traffic destination is one specific customer (this is for example the case of traffic generated by a telephone call or a web browsing session);

multicast traffic: the traffic destinations are two or more, possibly many customers (this is the case of traffic generated by video distribution applications).

An important issue of triple play services offering over a MAN is the transport optimization of multicast traffic (e.g. video broadcast distribution) from the hub Ethernet equipment to the spokes, i.e. the DSLAMs.

In the above-mentioned typical network configuration, each DSLAM is connected to a hub Ethernet equipment by a single GE channel carrying both unicast and multicast traffic. This solution has two major drawbacks:

many replicas of the multicast traffic need to be generated by the hub Ethernet equipment and forwarded to every DSLAM, with a remarkable increase in the packet forwarding load of the hub Ethernet equipment; and when the total traffic per DSLAM exceeds the 1 Gbit/s capacity of the GE channel, a second GE channel needs to be allocated to each DSLAM; this leads to an inefficient use of available bandwidth.

Actually, when distributing a high amount of multicast contents, it may happen that one GE channel is not enough to transport all the traffic towards a single DSLAM. As the number of customer connected to a DSLAM increases, it is more and more likely that a second GE channel needs to be allocated to each DSLAM, in order to satisfy the bandwidth requirement of a given services mix (for example, High Definition TV—HDTV—, i.e. Video on Demand—VoD—and Broadcast TV—BTV—, Voice over IP—VoIP—service, High Speed Internet—HSI).

When more than one GE channel is required for each DSLAM, a particularly efficient network architecture provides that one GE channel is dedicated to the broadcast traffic and is terminated in each DSLAM of the network ring. Hence, the broadcast traffic is simply forwarded by the hub Ethernet equipment over this shared GE channel without the need of generating as many replicas as the number of DSLAMs in the ring. In this way, the GE channels dedicated to unicast traffic are set free of the heavy multicast traffic, and can even be shared among two DSLAMs, provided that the total unicast traffic of the two DSLAMs is lower than 1 Gbit/s.

This solution leads to a remarkable saving in the number of GE channels with respect to the "brute force" solution consisting in the allocation of two GE channels per DSLAM. For example, the total traffic of eight DSLAMs may be transported over only five GE channels, instead of requiring sixteen GE channels. This implies a substantial saving in the optical transport network cost.

As mentioned before, in order for the network to be robust, should a node or a transport network link section experience a failure, each node of the ring should be able to reroute the traffic along a protection path alternative to the default transport path. This function can be performed by the WDM transmission systems, by means of established techniques like SNCP; such a feature is already available in the majority of the commercial WDM transmission systems. This however involves the provision of protection components or redundant elements, thereby the transmission system becomes complicated and expensive.

On the other hand, the protection functions can also be performed by the Ethernet equipments. In this latter case, the WDM transmission system does not need to have protection components or redundant elements, and can be particularly simple and cheap.

Actually, Ethernet protection schemes have already been developed and standardized by IEEE and ITU-T for point-to-point Ethernet links (e.g., the standard IEEE 802.3ad, Link Aggregation), or for meshed Ethernet networks (e.g., the standard IEEE 802.1w, Rapid Spanning Tree Protocol).

In WO 2007/073761 the use of Ethernet OAM (Operation, Administration and Maintenance) procedure like AIS (Alarm Indication Signal) and CC (Continuity Check) is disclosed, to check the operation of the default and back-up traffic distribution routes inside the logical topology.

Recently, some network equipment manufacturers have offered an alternative architecture solution for broadband multiservice transmission over Layer 2 networks, i.e. a service distribution over logical/physical rings. An example is given by Alcatel, in Metro Ethernet Update (2004), http://www.alcatel.com/com/en/appcontent/opgss/19570_BBAg_over_OptNet_an_tcm228-334011635.pdf. Triple play services are offered on Resilient Packet Ring (RPR) Ethernet rings over SDH (Synchronous Digital Hierarchy) or Ethernet with MPLS (multiProtocol Label Switching) fast reroute over CWDM (Coarse WDM), both assuring fast recovery of the order of 50 ms. The ring connect the central office to the access sites equipped with the manufacturer switches, each one point-to-point connected to a DSLAM. For multicast traffic, it is explicitly suggested the use of a common VLAN for all DSLAMs, without any traffic replication.

In U.S. Pat. No. 6,623,186, a protection scheme for Ethernet ring networks is disclosed where the Ethernet connection is optically switched from the working path to the protection path by means of an optical cross-bar switch. This is a physical layer protection technique.

SUMMARY OF THE INVENTION

The Applicant has observed that no protection schemes are today available that are specifically tailored for a network architecture wherein one GE channel is shared among two or more Ethernet nodes in a ring configuration, for example for the delivery of multicast traffic.

Spanning tree protocols, designed for point-to-point links, could be used in such a network configuration, but the convergence time would grow very quickly with the number of nodes, and would reach unacceptable values already for 5 or 6 nodes sharing a same GE channel.

The Applicant has tackled the problem of traffic protection in ring networks (i.e., networks having a physical or logical ring topology) whose nodes are Ethernet equipments (or equipments with Ethernet functions, supporting the Ethernet protocol), and which are architecturally designed to efficiently distribute multicast or broadcast traffic, saving communications channels.

In brief, the Applicant has found that the concept of "one-to-many" (i.e., point-to-multipoint) protection technique can advantageously be introduced and applied to Ethernet links (which normally are point-to-point links) shared among more than two nodes in a ring.

According to an aspect of the present invention, a method is provided of delivering multicast data traffic over a communication network comprising a first network node adapted in operation to deliver multicast data traffic to at least two second network nodes and wherein the first and second network nodes are connected to each other by a transmission network in a ring architecture and implement a point-to-multipoint layer 2 protocol.

The method comprises:
at the first network node:
 collecting alarms signals indicative of a failure condition of the transmission network along the whole ring and of the at least two second network nodes, and
 based on a current state of the alarm signals, delivering the multicast data traffic either in a first delivery direction along the ring, or in a second delivery direction along the ring opposite to the first delivery direction, or in both the first and second delivery directions along the ring;
at each of the at least two second network nodes:
 collecting local alarm signals indicative of a failure condition of the transmission network locally to the second network node and of the second network node, and
 based on a current state of the local alarm signals:
  either receiving the multicast data traffic delivered by the first network node from the first direction along the ring, forwarding the multicast data traffic in the first direction along the ring and transmitting local data traffic to the first network node along the second delivery direction, or receiving the data traffic delivered by the first network node from the second direction along the ring, forwarding the multicast data traffic in the second direction along the ring and transmitting the local data traffic to the first network node along the first delivery direction along the ring.

In particular, said network nodes may be Ethernet network nodes.

Said local alarm signals collected by each of the at least two second network nodes may include:
continuity check alarm signals related to a first and a second Ethernet flow points, wherein the first Ethernet flow point is configured to receive the multicast data traffic delivered by the first network node from the first direction and to transmit local data traffic to the first network node along the second delivery direction, and the second Ethernet flow point is configured to receive the multicast data traffic delivered by the first network node from the second direction and to transmit local data traffic to the first network node along the first delivery direction; and
alarm indication signals related to the first and second Ethernet flow points.

Said alarms signals collected by the first network node may include:
continuity check alarm signals related to the first and the second Ethernet flow points of each of the at least two second network nodes; and
alarm indication signals related to the first and second Ethernet flow points of each of the at least two second network nodes.

Said alarm indication signals may be Loss Of Signal alarm indications.

In particular, the first network node may be adapted to:
deliver the multicast data traffic in the first delivery direction in case no continuity check alarm signal is asserted;
deliver the multicast traffic in the second delivery direction in case at least one continuity check alarm signal is asserted, at least one alarm indication signal related to the first Ethernet flow point of one of the at least two second network nodes is asserted, and no alarm indication signal related to the second Ethernet flow point of one of the at least two second network nodes is asserted;
deliver the multicast in both the first and second delivery directions along the ring in case at least one continuity check alarm signal is asserted, and no alarm indication signal related to the first Ethernet flow point of one of the at least two second network nodes is asserted.

The first network node may be adapted to return to deliver the multicast traffic in the first delivery direction after said alarm signals are deasserted, and each of the at least two second network nodes returns to receive the multicast data traffic delivered by the first Ethernet network node from the first direction along the ring, forward the multicast data traffic in the first direction along the ring and transmit local data traffic to the first Ethernet network node along the second delivery direction after said local alarm signals are deasserted.

According to another aspect of the present invention, a hub network node is provided, adapted to deliver multicast data traffic over a communication network comprising the hub network node and at least two spoke network nodes and a transmission network connecting the hub and spoke network nodes in a ring architecture, and wherein the hub network node and the spoke network nodes implement a point-to-multipoint layer 2 protocol, the hub network node comprising a multicast traffic delivery protection function adapted to:

collect alarms signals indicative of a failure condition of the transmission network along the whole ring and of the at least two spoke network nodes, and
based on a current state of the alarm signals, causing the delivery of the multicast data traffic either in a first delivery direction along the ring, or in a second delivery direction along the ring opposite to the first delivery direction, or in both the first and second delivery directions along the ring.

The hub network node and said at least two spoke network nodes may in particular be Ethernet network node, and said alarm signals may include:
continuity check alarm signals related to a first and a second Ethernet flow points of each of the at least two spoke network nodes, wherein the first Ethernet flow point is configured to receive the multicast data traffic delivered by the hub network node from the first direction and to transmit local data traffic to the hub network node along the second delivery direction, and the second Ethernet flow point is configured to receive the multicast data traffic delivered by the hub network node from the second direction and to transmit local data traffic to the hub network node along the first delivery direction; and
alarm indication signals related to the first and second Ethernet flow points of each of the at least two spoke network nodes.

Said alarm indication signals may be Loss Of Signal alarm indications.

The hub network node may be adapted to:
deliver the multicast data traffic in the first delivery direction in case no continuity check alarm signal is asserted;
deliver the multicast traffic in the second delivery direction in case at least one continuity check alarm signal is asserted, at least one alarm indication signal related to the first Ethernet flow point of one of the at least two spoke network nodes is asserted, and no alarm indication signal related to the second Ethernet flow point of one of the at least two spoke network nodes is asserted;
deliver the multicast in both the first and second delivery directions along the ring in case at least one continuity check alarm signal is asserted, and no alarm indication signal related to the first Ethernet flow point of one of the at least two spoke network nodes is asserted.

The hub network node may be adapted to return to deliver the multicast traffic in the first delivery direction after said alarm signals are deasserted.

According to yet another aspect of the present invention, a spoke network node is provided adapted to receive multicast data traffic delivered by a hub network node connected to the spoke network by a transmission network in a ring architecture, and wherein the spoke network node implement a point-to-multipoint layer 2 protocol, the spoke network node comprising a multicast traffic delivery protection function adapted to:
collect local alarm signals indicative of a failure condition of the transmission network locally to the spoke network node and of the spoke network node, and
based on a current state of the local alarm signals:
either causing the reception of the multicast data traffic delivered by the hub network node from a first delivery direction along the ring, the forwarding of the multicast data traffic in the first direction along the ring and the transmission of local data traffic to the hub network node along a second delivery direction along the ring opposite to the first delivery direction,
or causing the reception of the multicast data traffic delivered by the hub network node from the second delivery direction along the ring, the forwarding of the multicast data traffic in the second delivery direction along the ring and the transmission of the local data traffic to the hub network node along the first delivery direction along the ring.

The spoke network node may in particular be an Ethernet node, and said local alarm signals collected by the spoke network node may include:

continuity check alarm signals related to a first and a second Ethernet flow points, wherein the first Ethernet flow point is configured to receive the multicast data traffic delivered by the hub network node from the first delivery direction and to transmit local data traffic to the hub network node along the second delivery direction, and the second Ethernet flow point is configured to receive the multicast data traffic delivered by the hub network node from the second delivery direction and to transmit local data traffic to the hub network node along the first delivery direction; and alarm indication signals related to the first and second Ethernet flow points.

The spoke network node may be adapted to return to receive the multicast data traffic delivered by the hub Ethernet network node from the first delivery direction along the ring, forward the multicast data traffic in the first direction along the ring and transmit local data traffic to the hub Ethernet network node along the second delivery direction after said local alarm signals are deasserted.

According to still another aspect of the present invention, a communication network is provided, comprising:

a first network node;

at least two second network nodes;

a transmission network connecting the first and second network nodes in a ring architecture;

wherein:

the first network node is a hub network node according to one of the previous aspects of the invention, and each of the second network nodes is a spoke network node according to one of the previous aspects of the invention.

At the physical level, the connections between the network nodes may be point-to-point transmission links (either electrical or optical), or be accomplished by means of other systems, e.g. an optical transmission system, like a WDM or CWDM system.

An advantage of the protection scheme according to the present invention is that it exploits already standardized OAM signals and operation modes.

The intervention time of the proposed protection scheme is much shorter than that of known techniques like those based on spanning tree protocols, and is almost independent of the number of network nodes in the ring network.

Another advantage is that the proposed protection scheme is not based on complicated protocols and does not require sophisticated computations in the network nodes.

The proposed protection scheme ensures the same degree of protection for uplink and downlink connections, and ensures that the uplink and the downlink traffic are transmitted always through the same physical path.

The proposed protection scheme is particularly adapted to network configurations where the multicast traffic is delivered to the various spokes over a common distribution channel, shared among many network nodes.

BRIEF DESCRIPTION OF THE DRAWINGS

The features and advantages of the present invention will be best understood by reading the following detailed description of some embodiments thereof, provided merely by way of non-limitative example, description that will be conducted making reference to the annexed drawings, wherein.

DETAILED DESCRIPTION OF SOME EMBODIMENTS OF THE INVENTION

Figure 1:
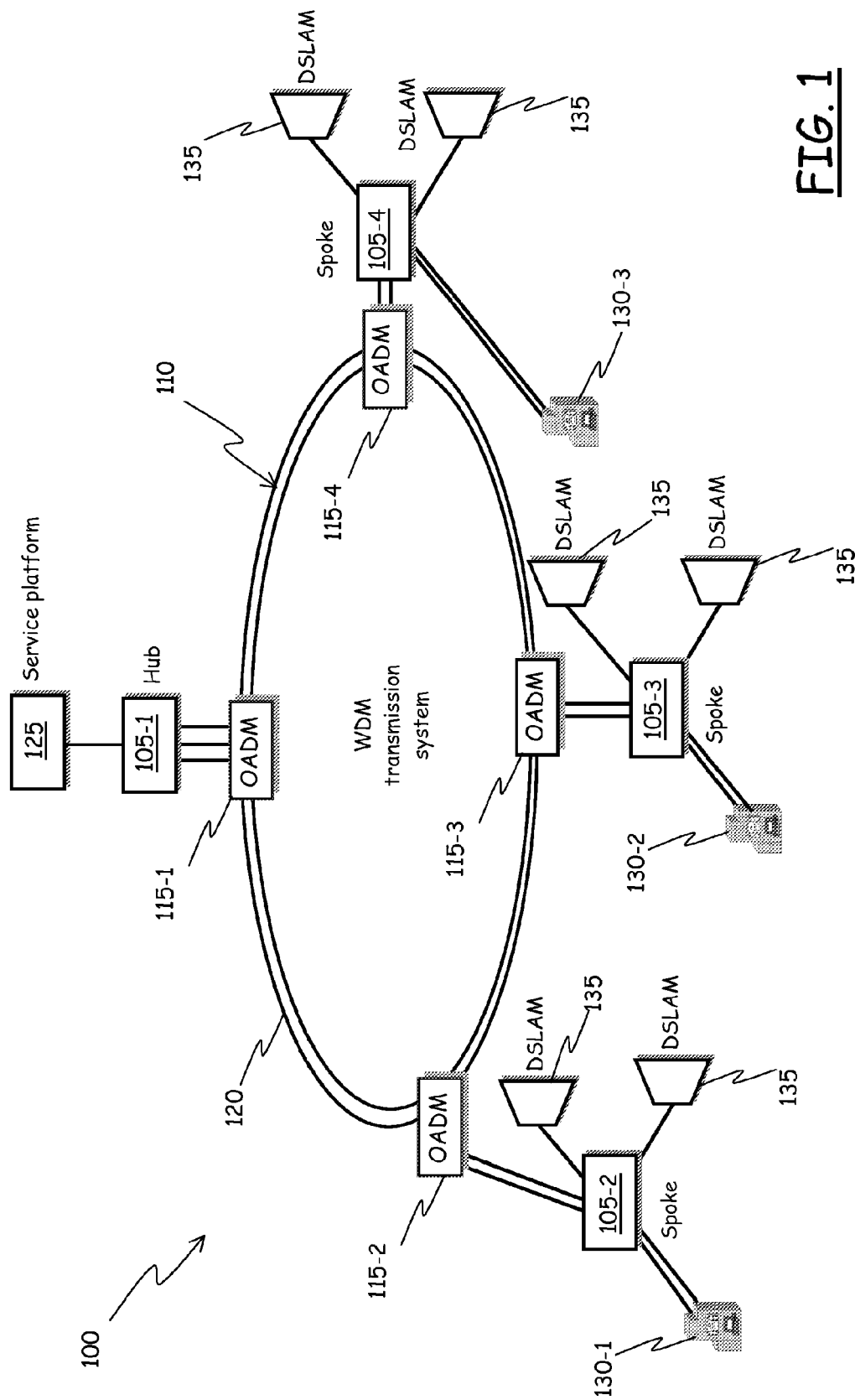
FIG. 1 schematically shows a typical architecture of a metropolitan Ethernet network, a scenario in which the present invention can advantageously be applied.

Making reference to the drawings, in FIG. 1 there is schematically shown a typical architecture of a metropolitan Ethernet network, a scenario in which the present invention can advantageously be applied.

The network, globally denoted as 100, is composed of a plurality of network nodes including Ethernet equipments, or equipments with Ethernet functions; in the shown example, four Ethernet equipments 105-1, 105-2, 105-3 and 105-4 are shown, connected in a ring topology by means of an optical transmission system, particularly a WDM transmission system 110. The WDM transmission system 110 comprises OADMs (Optical Add-Drop Multiplexers) 115-1, 115-2, 115-3 and 115-4, each one associated with a respective one of the Ethernet equipments 105-1, 105-2, 105-3 and 105-4, and an optical transport network 120.

The Ethernet equipment 105-1 is a hub Ethernet equipment, devoted to traffic concentration and distribution over the WDM transmission system 110, and may be connected to one or more service platforms 125.

The Ethernet equipments 105-2, 105-3 and 105-4 are access Ethernet equipments, devoted to traffic distribution to customers of the network 100; these Ethernet equipments form the spokes of the network. The customers of the network 100 may be large business entities (like companies, universities, government agencies and the like) having a direct connection to the spoke Ethernet equipments, like the customers 130-1, 130-2 and 130-3 in the drawing, or small business entities and/or individuals, e.g. SOHO (Small Office-Home Office) customers or residential customers; these customers do not have a direct connection to the spoke Ethernet equipments, but instead access the latter through access equipments, like for example DSLAMs 135.

Figure 2:
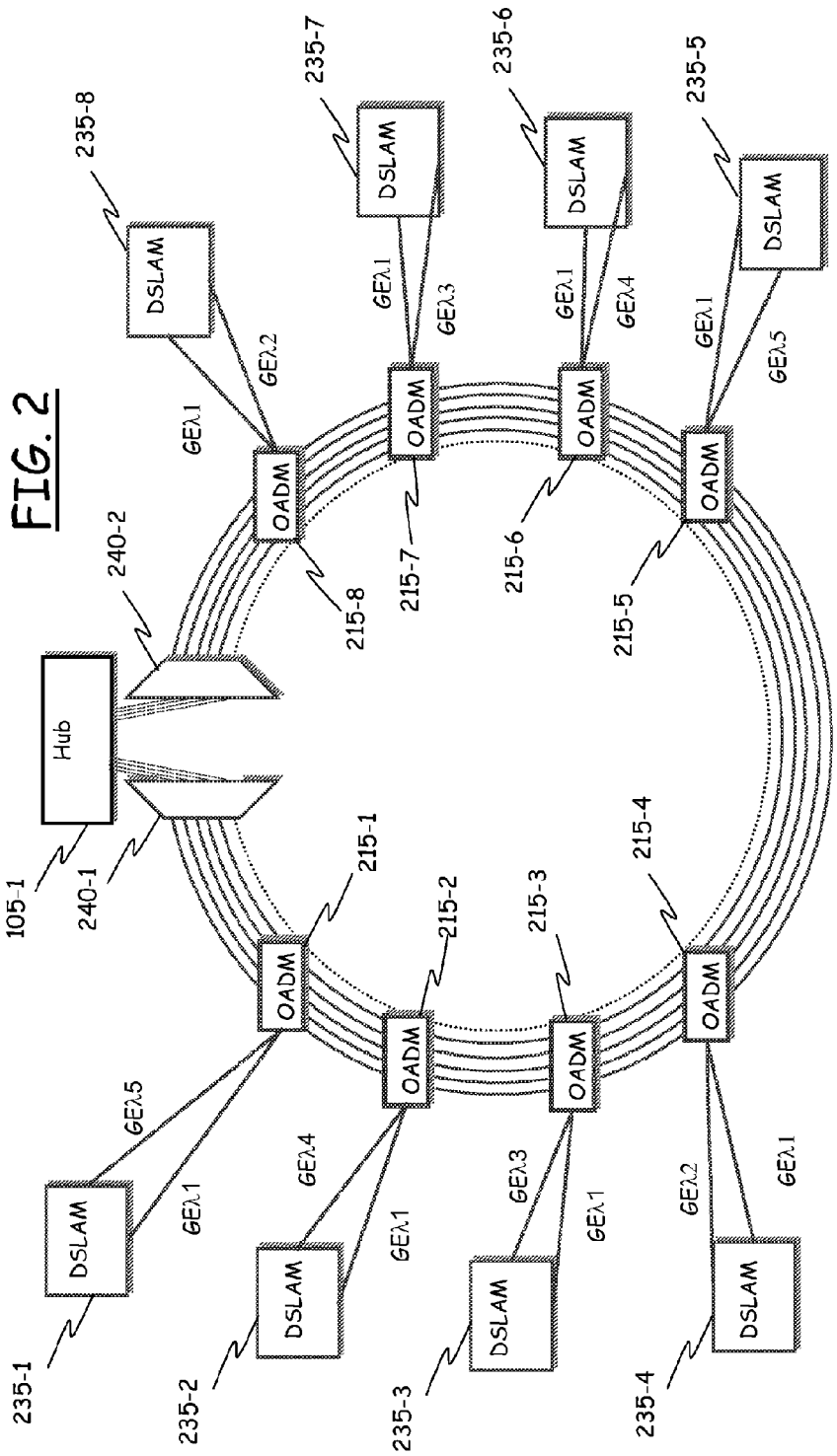
FIG. 2 schematically shows a possible allocation of WDM channels in the network of FIG. 1.

FIG. 2 schematically shows a possible allocation of optical channels in the network of FIG. 1, particularly efficient in those cases where more than one GE channel is required for the DSLAMs. It is assumed that a total of eight GE channels are available (8-WDM transmission system), each corresponding to a respective optical wavelength, and eight DSLAMs 235-1 to 235-8 are present. In the drawing, eight OADMs 215-1 to 215-8 associated with the DSLAMs 235-1 to 235-8 are also depicted, whereas the spoke Ethernet equipments to which the DSLAMs 235-1 to 235-8 are connected are not shown, for not unnecessarily complicating the figure. Blocks 240-1 and 240-2 denote optical multiplexers.

One of the eight GE channels, in the shown example the GE channel GEλ1, is dedicated to broadcast traffic, and terminates at each DSLAM 235-1 to 235-8 in the ring network; the remaining GE channels are dedicated to unicast traffic; any of these unicast traffic GE channels can be shared among two or more DSLAMs; for example, a GE channel GEλ2 is shared among the DSLAMs 235-4 and 235-8, a GE channel GEλ3 is shared among the DSLAMs 235-3 and 235-7, a GE channel GEλ4 is shared among the DSLAMs 235-2 and 235-6, and a GE channel Gλ5 is shared among the DSLAMs 235-1 and 235-5. As discussed in the foregoing, devoting one GE channel to multicast traffic and terminating the multicast traffic GE channel at each DSLAM in the network ring allows avoiding the need for the hub Ethernet equipment 105-1 of generating and transmitting several replicas of the multicast traffic; also, since the remaining GE channels are set free of the heavy multicast traffic, they can be shared among two or more different DSLAMs (provided that the total unicast traffic for the two or more DSLAMs that share a common GE channel is less than 1 Gbit/s). This GE channels allocation allows saving the number of GE channels needed, compared to a case in which two GE channels are allocated to each DSLAM, one for the multicast traffic and another one for the unicast traffic (indeed, sixteen GE channels would in such a case be necessary, compared to the five as in the considered solution).

Figure 3:
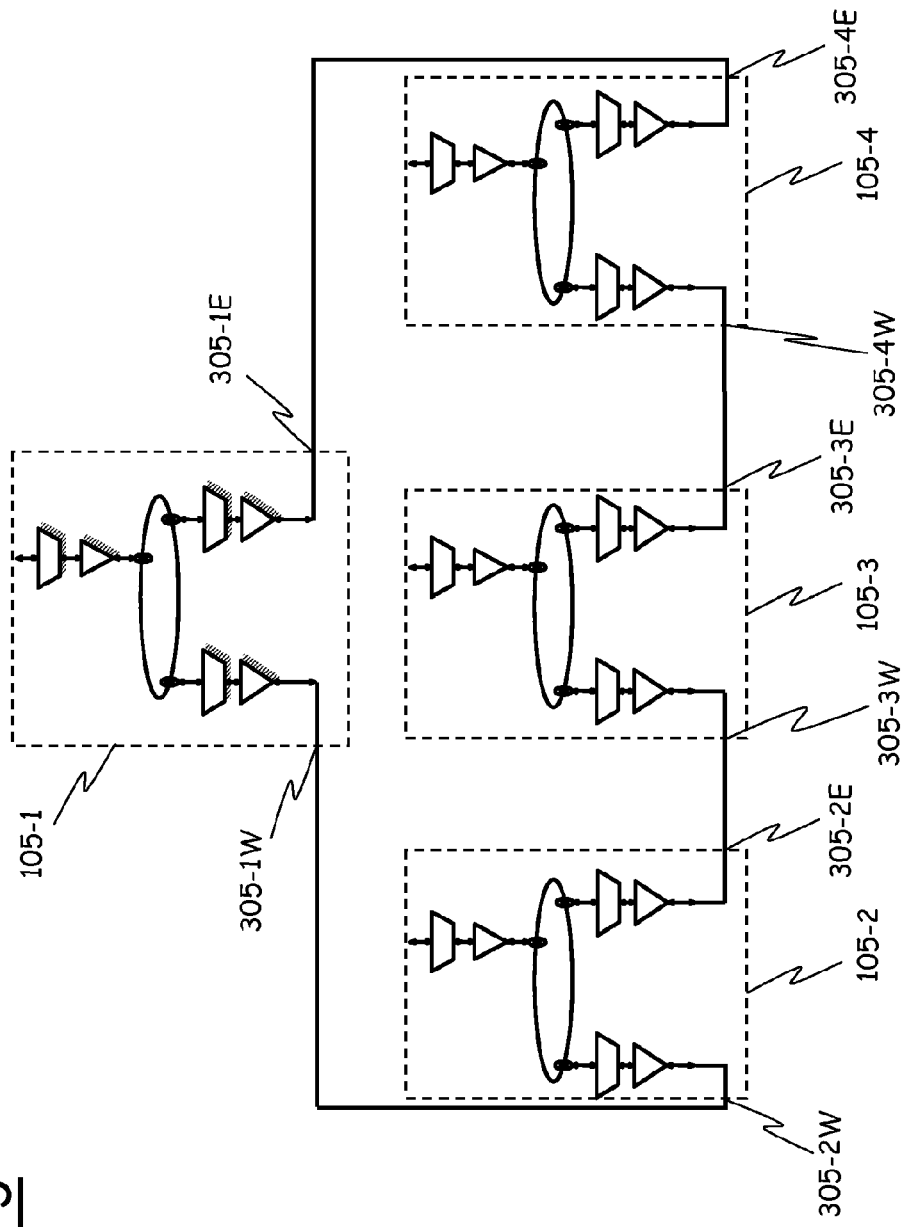
FIG. 3 is a schematic topological representation of a protection scheme according to an embodiment of the present invention for the protection of multicast traffic over an Ethernet ring network.

FIG. 3 is a schematic topological representation of a protection scheme according to an embodiment of the present invention, for the protection of multicast traffic delivered over the Ethernet ring network of FIG. 1. The hub Ethernet equipment 105-1 is the access node to the network ring (which allows service platforms, like the service platform 125 shown in FIG. 1, to access the network ring), whereas each of the spoke Ethernet equipments 105-2, 105-3, 105-4 is a drop-and-continue node, which receives the traffic from the hub Ethernet equipment 105-1 or from a preceding spoke Ethernet equipment in the network ring, drops the traffic directed to its customers, and forwards the multicast traffic and/or the traffic not directed to its customers to the following spoke Ethernet equipment in the network ring.

It is pointed out that although only three spoke Ethernet equipments are considered, this is not to be construed limitatively to the present invention, which applies irrespective of the number of spoke Ethernet equipments in the network ring.

Figure 4:
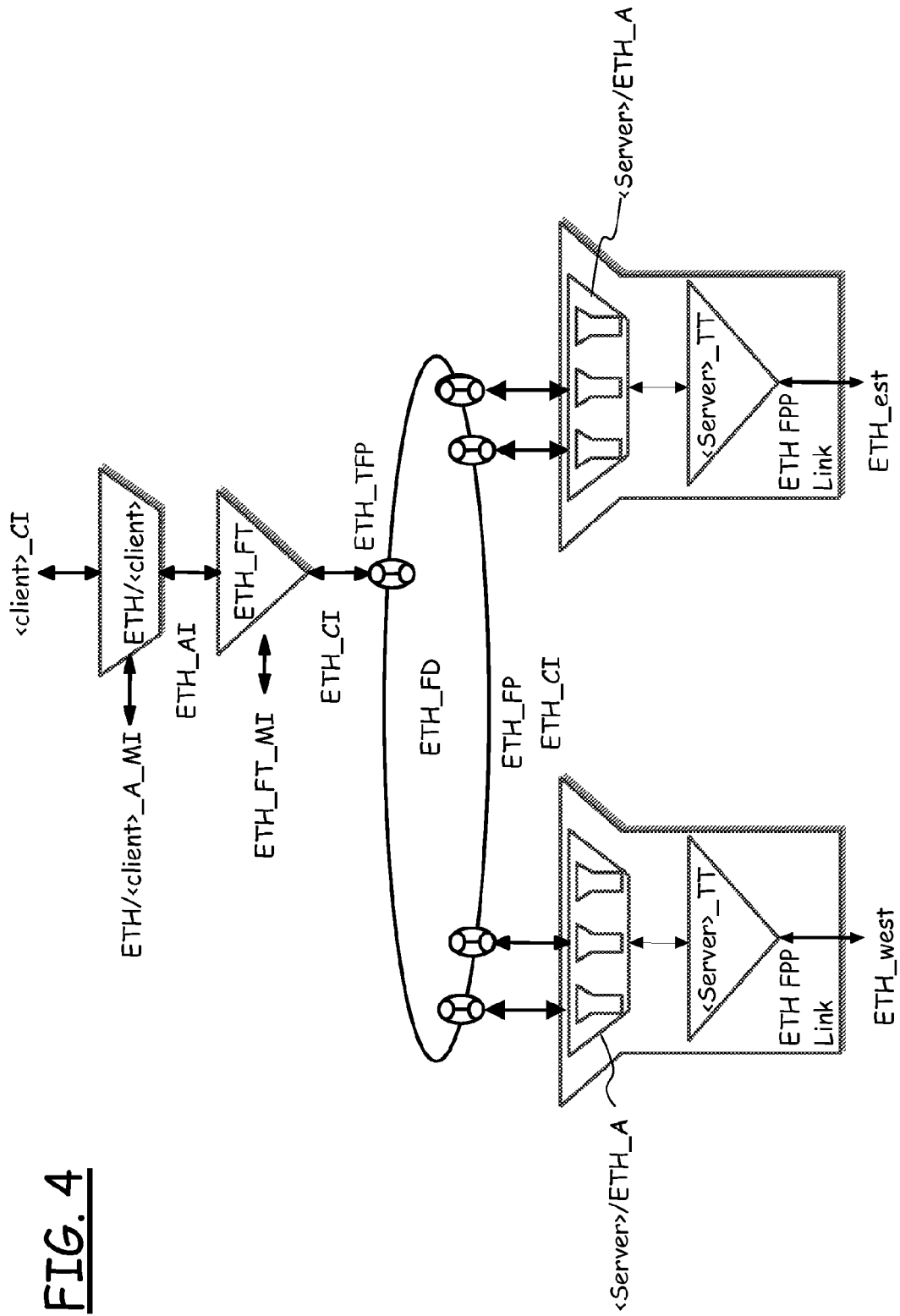
FIG. 4 depicts a model of an Ethernet network node in terms of atomic functions.

The symbolism and concepts adopted in FIG. 3 for representing the Ethernet equipments refer to the model description of an Ethernet equipment as atomic functions defined in the ITU-T Recommendation G.8021/Y.1341 (08/2004); this model is depicted in FIG. 4. In the model, the prefix "ETH" denotes the Ethernet MAC (Media Access Control) layer, and the various symbols represent (as specified in the ITU-T Recommendation G.8010/Y.13.06 (02/2004)):

ETH_FT: Ethernet flow termination functions,
ETH_FT_MI: Ethernet flow termination management information, for the interface towards management applications.
ETH_FD: Ethernet flow domains.
ETH-FP denotes Ethernet flow points.
ETH-FPP: Ethernet Flow Point Pool, a group of co-located Ethernet flow points that have a common routing.
ETH-TFP: Ethernet termination flow points.
ETH_CI: Ethernet Characteristic Information (CI); the Ethernet CI is a (non-) continuous flow of ETH_CI traffic units; the generic ETH_CI traffic unit consists of the following set of signals: Destination Address (DA), Source Address (SA), MAC Service Data Unit (M_SDU) with optional Priority (P).
<client_CI>: client's Characteristic Information (CI) (in ITU indicates frame format)
ETH_AI: Ethernet Adapted Information (AI) (i.e. Ethernet that carry out MPLS frame)
ETH/<client>: Ethernet/client adaptation functions, consisting of client-specific processes and server-specific processes for managing the passage from CI to AI.
ETH/<client>_A_MI:Ethernet/client adaptation management information, the connection for the management information of the adaptation function
<Server>/ETH_A: Server/ETH single Ethernet flow point adaptation functions, that provide the Ethernet link end functionality. The Server/ETH adaptation function is considered to consist of two types of processes: client-specific processes and server-specific processes. The client-specific processes are associated with the ETH_CI traffic units, which ingress/egress via the Ethernet flow points ETH_FP.
<Server>/_TT: Server Trail Termination (TT), the result of the encapsulation of the client (e.g., MPLS) frame in an Ethernet frame, that can be treated as a generic Ethernet packet.
ETH_west: the Ethernet equipment port connected to the west-side of the network ring.
ETH_east: the Ethernet equipment port connected to the east side of the network ring.

Referring back to FIG. 3, the access node 105-1 has the west-sided port 305-1W coupled to the west-side port 305-2W of the drop-and-continue node 105-2; the east-side port 305-2E of the drop-and-continue node 105-2 is coupled to the west-side port 305-3W of the drop-and-continue node 105-3, which has its east-side port 305-3E coupled to the west-side port 305-4W of the drop-and-continue node 105-4; the east-side port 305-4E of the drop-and-continue node 105-4 is coupled to the east-side port 305-1E of the access node 105-1. The access node 105-1 can distribute the traffic on the west and east sides of the network ring, over a single VLAN (Virtual LAN) ID (Identifier), identifying a single sub-network. The other, drop-and-continue nodes 105-2, 105-3 and 105-4 perform the operation of "drop and continue" of the traffic at the Ethernet switching level, and assure the network protection, according to the scheme described later.

Figure 5:
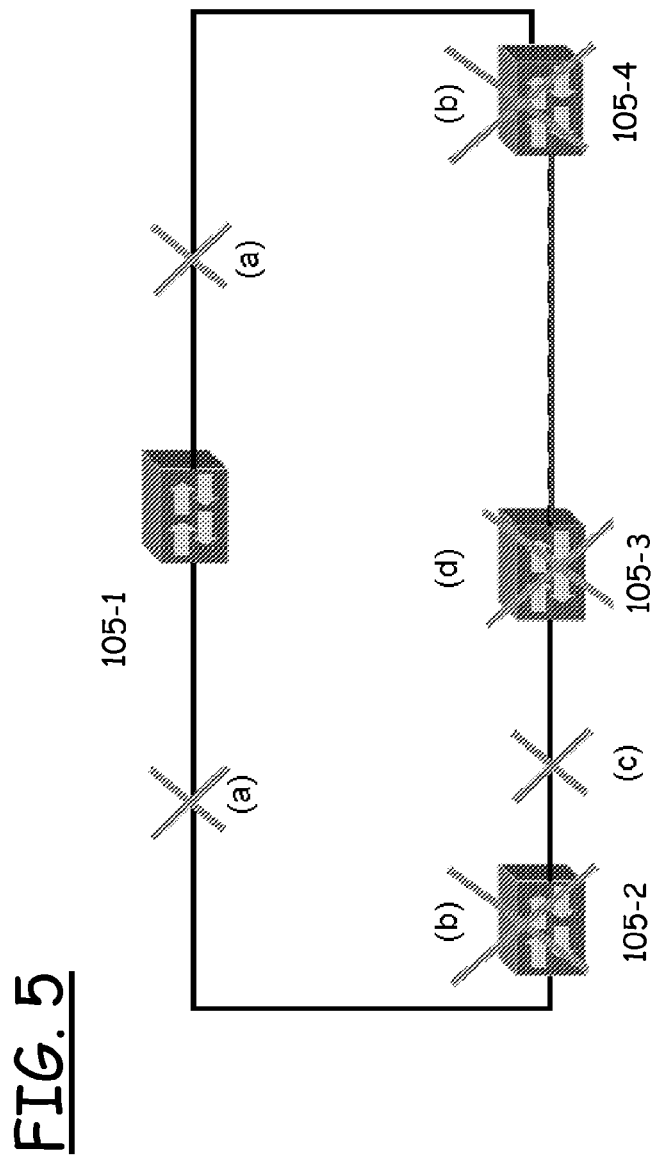
FIG. 5 schematically depicts possible failure events.

FIG. 5 schematically depicts possible types of faults that may occur in the network of FIG. 1, and against which the network should be protected to be robust. Four types of fault events are possible:

type a): unidirectional or bidirectional link failures on a section of the transport network directly connected to the access node 105-1;

type b): equipment failure of those drop-and-continue nodes directly connected to the access node 105-1, like the nodes 105-2 and 105-4;

type c): unidirectional or bidirectional link failures on a section of the transport network between two drop-and-continue nodes; and type d): equipment failure of those drop-and-continue nodes not directly connected to the access node 105-1, like the node 105-3.

Hereinafter, a protection scheme according to an embodiment of the present invention is described. A 1:n, i.e. point-to-multipoint protection with Automatic Protection Switching (APS) over a VLAN implemented over an Ethernet native pipe or another transmission channel (a g. WDM, PDH, SDH . . . ) is considered. In particular, the configuration of the nodes and the processes involved for the accomplishment of the protection will be described.

Figure 6:
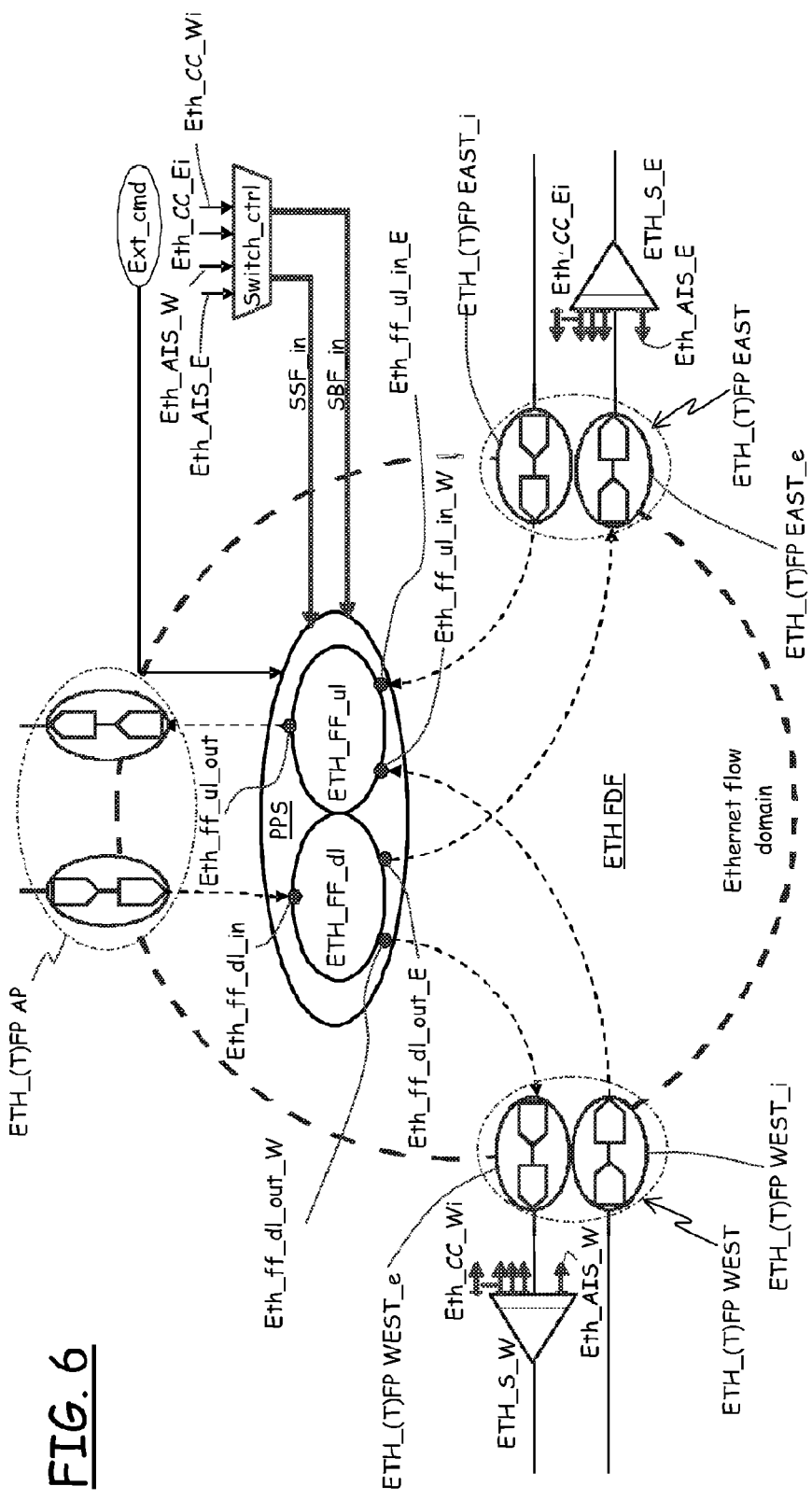
FIG. 6 schematically shows, using the symbolism of FIG. 4, a hub Ethernet network node of the network of FIG. 1, in an embodiment of the present invention.

FIG. 6 depicts the configuration of the access node 105-1, in an embodiment of the present invention.

From the functional viewpoint, the access node 105-1 is an Ethernet switch representing the Ethernet flow domain flow ETH FDF in which a VLAN is connected to two different ports (east port and west port) to implement the traffic protection. The Ethernet switch is capable of replicating the traffic on both sides of the network ring.

Logical ports ETH_(T)FP WEST and ETH_(T)FP EAST of the access node 105-1 can be connected to the transport network by copper wires, fibers or channels of a WDM system. At the logical level, the Ethernet connection can be achieved by means of a VLAN identifier as a sub-interface of a physical port, or a particular MAC address learned by the physical port as well.

In the Ethernet flow domain flow ETH FDF, both uplink and downlink information flows are considered in order to describe the protection operation.

Within the Ethernet flow domain flow ETH FDF of the access node 105-1, a protection process space PPS is provided; the protection process space PPS includes sub-processes ETH_FF_dl and ETH_FF_ul for the downlink and uplink directions, respectively.

West-side and east-side ingress/egress ports ETH_(T)FP WEST and ETH_(T)FP EAST of the access node 105-1, which represents the service end points, are connected with internal SAPs (Service Access Points) of the sub-processes ETH_FF_dl and ETH_FF_ul of the protection process space PPS, respectively denoted Eth_ff_dl_in_W and Eth_ff_dl_in_E for the downlink direction at the west and east sides, and Eth_ff_ul_out_W and Eth_ff_ul_out_E for the uplink direction at the west and east sides.

In the downlink direction, the information flow can exit from two different SEPs (Service Egress Points) ETH_(T)FP WEST_e and ETH_(T)FP EAST_e of the ingress/egress ports ETH_(T)FP WEST and ETH_(T)FP EAST, which are connected to the SAPs Eth_ff_dl_out_W and Eth_ff_dl_out_E the sub-processes ETH_FFdl and ETH_FFul, respectively. For the uplink direction, ingress points ETH_(T)FP WEST_i and ETH_(T)FP EAST_i of the west-side and east-side ingress Ethernet ports ETH_T(T)FP WEST and ETH_T(T)FP EAST are connected to the sub-processes ETH_FF_dl and ETH_FF_ul of the protection process space PPS through the two SAPs Eth_ff_ul_in_W and Eth_ff_ul_in_E, respectively.

The algorithm that implements the protection scheme according to the herein described invention embodiment determines how and under which conditions the traffic received, from an ingress port of the Ethernet termination flow point ETH_(T)FP_AP of the access node 105, at a SAP Eth_ff_dl_in of the sub-processes ETH_FF_dl is enabled to flow out of the two SAPs Eth_ff_dl_out_W and Eth_ff_dl_out_E, and thus out of the two different SEPs ETH_(T)FP WEST_e and ETH_(T)FP EAST_e of the access node 105-1. The protection algorithm also determines how to transfer the information received at the SAPs Eth_ff_ul_in_W and Eth_ff_ul_in_E to a SEP Eth_ff_ul_out of the sub-process ETH_FF_ul, connected to an egress port of the Ethernet termination flow point ETH_(T)FP_AP of the access node 105-1.

A function Ext_cmd is provided to implement forced switch and lock-out functions of the protection algorithm, as specified in the ITU-T Recommendation G.841 (sections. 7.1.2, 7.1.4), and conditions the operation of the protection process space PPS.

The protection algorithm that implements the protection scheme for the access node according to the herein described invention embodiment is schematized in the drawing by a block denoted Switch_ctrl; the protection algorithm may be practically implemented as a finite-state machine. In an embodiment of the present invention, the protection algorithm receives as inputs alarms signals; in particular, the alarms signals that are monitored by the protection algorithm Switch_ctrl at the access node 105-1 may include the following:

- an alarm signal Eth_AIS_W, being an Alarm Indication Signal (AIS) received from the west-side Ethernet port ETH_(T)FP WEST of the access node 105-1;
- an alarm signal Eth_LOS_W, indicating the detection of an Ethernet Loss Of Signal (LOS) at the west-side Ethernet port ETH_(T)FP WEST of the access node 105-1;
- for each of the drop-and-continue nodes 105-2, 105-3, 105-4 in the transport network along the west side, a respective alarm signal Eth_CC_Wi (i=2, 3, 4 in the considered example), which is an Ethernet Continuity Check (CC) signal of that drop-and-continue node;
- an alarm signal Eth_AIS_E, being an AIS received from the east-side Ethernet port ETH_(T)FP EAST of the access node 105-1;
- an alarm signal Eth_LOS_E indicating the detection of Ethernet LOS at the east-side Ethernet port ETH_(T)FP EAST of the access node 105-1;
- for each of the drop-and-continue nodes 105-2, 105-3, 105-4 in the transport network along the east side, a respective alarm signal Eth_CC_Ei (i=2, 3, 4 in the considered example), which is an Ethernet CC signal of that drop-and-continue node;

All these alarm signals are defined in ITU-T Recommendation Y.1730, to which reference is made for their detailed description.

Based on the state of the monitored alarm signals, the protection algorithm Switch_ctrl at the access node 105-1 calculates, for each connection direction (uplink and downlink), the PPS traffic forwarding state; the latter depends on two signals generated by the protection algorithm Switch_ctrl:

1. a control signal denoted server switch fail SSF_in, which determines the activation of the protection switchover operation from the default direction to the protection direction, for example from west to east;
2. a control signal denoted server broadcast fail SBF_in, which determines the activation of the distribution of the traffic on both sides (east and west) when a fault occurs on equipments or transport network trunks not directly attached to the access node 105-1 (faults type c) and d) described above).

In addition to the two signals server switch fail SSF_in and server broadcast fail SBF_in, the traffic switchover is further conditioned by an external control signal Ext_cmd, already defined in the above-cited Recommendation ITU-G.841, which defines the connection with managing entities.

On the transmission sides of ports ETH_(T)FP WEST and ETH_(T)FP EAST (i.e., on the SEPs ETH_(T)FP WEST_e and ETH_(T)FP EAST_e) of the access node 105-1, two MEPs (Maintenance entity End Point) functions ETH_S_W and ETH_S_E are provided, adapted to extract, from the corresponding network ring trunk side, the alarm signals required by the protection algorithm Switch_ctrl to calculate the state of server signal fail SSF_in and server broadcast fail SBF_in.

Figure 7:
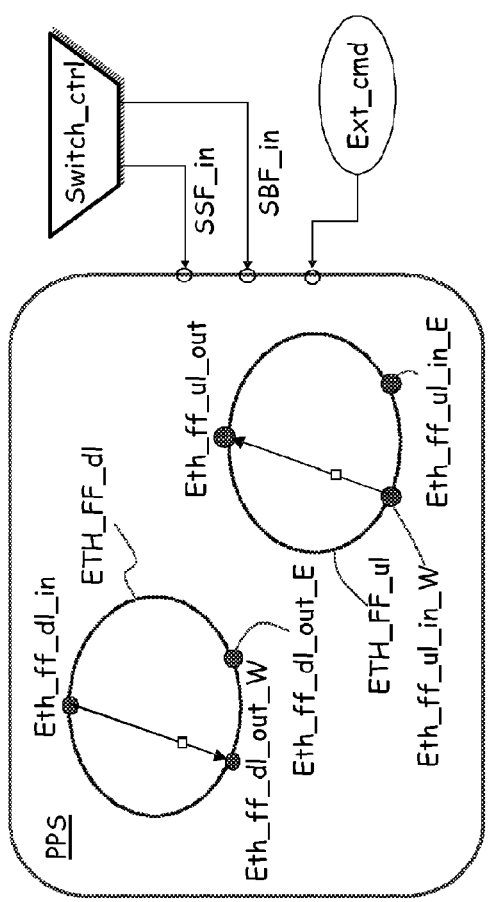
FIG. 7 schematically shows the operation of a protection mechanism implemented at the hub Ethernet network node.

Let the connection space inside the protection process space PPS and the interworking criteria with the external control functions Switch_ctrl and Ext_cmd be considered. FIG. 7 shows schematically the protection process space PPS in the access node 105-1 in an exemplary default condition, when the control signals SSF_in, SBF_in and Ext_cmd are in a clear state (i.e., they are not asserted, for example at the low logic state L). The sub-processes ETH_FF_dl, for the downlink connection, and ETH_FF_ul, for the uplink connection, are essentially traffic switching processes reserved to the bidirectional connection. Each connection direction has three service points (an ingress and two egresses), where service is created and activated (packet forwarding); an exemplary default condition for the downlink direction may provide that the service ingress is the SAP Eth_ff_di_in and the default output is the SEP Eth_ff_dl_out_W, whereas for the uplink direction the default output is the SEP Eth_ff_ul_out and the default SAP is Eth_ff_ul_in_W.

The access node 105-1 has the main function of distributing the traffic to all the other nodes in the network ring. The protection mechanisms applied by the access node 105-1 depend on the types of failure occurring.

When the fault is on the active (i.e. default) traffic distribution link, in the considered example the link on the west side of the access node 105-1, or on the drop-and-continue node 105-2 directly connected to the access node 105-1 along the west side of the ring, the access node 105-1 activates, as a consequence of the failure, a "switch mode", and the traffic that was up to that time, in normal operation condition, distributed just on one side (the default side, in the considered example the west side) is switched to the other side (the protection side, which in the considered example is the east side).

When the fault occurs on a transport network trunk or on a drop-and-continue node not directly connected to access node 105-1, like the node 105-3, or a transport network trunk between the node 105-3 and the adjacent nodes 105-2 and 105-4, the access node 105-1 activates, as a consequence of the failure, a "broadcast mode", and the traffic that was up to that time distributed just on one side (the default side, i.e. the west side in the considered example) in normal operation condition starts to be broadcast on both sides (east and west).

For example, if the network experiences no failures (normal operating condition), and assuming that the default traffic distribution side is the west side, the traffic flows along the west side from access node 105-1 to each drop-and-continue node 105-2, 105-3, and 105-4. The last drop-and-continue node 105-4 receives the traffic from the west side and sends it back to the access node 105-1 (along the uplink connection) always on the west side. Each drop-and-continue node in the network ring also replicates and forwards the traffic from west to east side (to allow the next drop-and-continue node in the ring to receive it), as a normal packet equipment; the last drop-and-continue node 105-4 in the network ring from west to east, that is directly connected to the east side of the access node 105-1, forwards traffic also on the east side, but the particular configuration of the access node 105-1 in normal operating condition discards return traffic received at the east side, thus avoiding any traffic loop.

If a network element or a transport network trunk between two drop-and-continue nodes fails, the protection algorithm Switch_ctrl still keeps the control signal SSF_in de-asserted, but it asserts the control signal SBF_in (raising it to the high logic level H); the access node thus activates 105-1 the broadcast mode, and the traffic is thus allowed to flow on both network ring sides. In this case, the traffic loop is avoided by the existing network fault, that opens the ring connection.

Table 1 hereinbelow represents the control signals states and the internal SAPs states (inside the protection process space PPS) for the switch mode (control signal SSF_in asserted) or the broadcast mode (control signal SBF_in asserted).

TABLE 1

| SSF_in | SBF_in | Output_dl enabled | Output_ul enabled |
|---|---|---|---|
| L | L | Eth_ff_dl_out_W | Eth_ff_ul_in_W |
| L | H | both | Both |
| H | L | Eth_ff_dl_out_E | Eth_ff_ul_in_E |
| H | H | not allowed | not allowed |

In particular, Table 1 shows the relationship between the states of the control signals SBF_in and SSF_in and the internal SAPs defined to forward multicast traffic for downlink (Eth_ff_dl_out_W and Eth_ff_dl_out_E) and for uplink (Eth_ff_ul_in_W and Eth_ff_ul_in_W) directions. The first table row (both control signals SBF_in and SSF_in de-asserted) means that the network is fully operational (no faults are detected) and the multicast traffic is routed on the default side (west side in this example). The condition where the control signal SSF_in is de-asserted and the control signal SBF_in is asserted (second table row) means that the system is operating in broadcast mode, thus the multicast traffic is distributed over both ring sides (this means that the ring is open due to a fault on a link between drop-and-continue nodes or on a drop-and-continue node not directly connected to access node). The case in which the control signal SSF_in is asserted and the control signal SBF_in is de-asserted (third table row) is the condition in which the system has detected a failure on a network ring section close to the access node along the default traffic forwarding side, thus the access node 105-1 completely switches traffic over the protection side (east side in this example) in order to recover this kind of failure. The last case (fourth table row) in which both the control signals SSF_in and SBF_in are asserted is not applicable, because the protection algorithm Switch_ctrl is capable of discriminating two different fault scenarios in order to apply the correct protection strategy.

Figure 8:
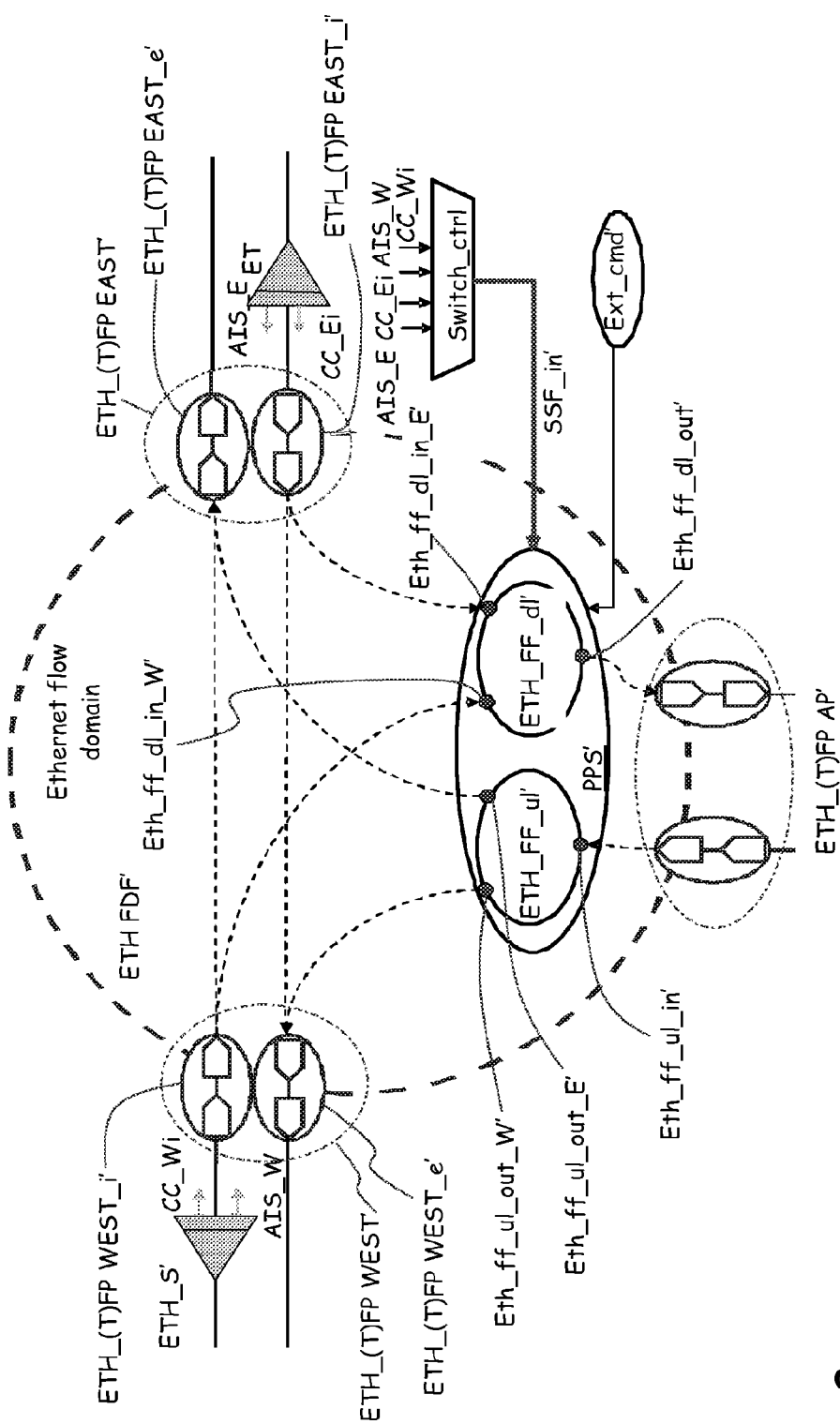
FIG. 8 schematically shows, using the symbolism of FIG. 4, a spoke Ethernet network node of the network of FIG. 1, in an embodiment of the present invention.

Passing now to the drop-and-continue nodes, FIG. 8 shows the configuration of a generic drop-and-continue node 105-2, 105-3, 105-4, adopting the same symbolism as for the access node 105-1. In particular, the scheme represents a generic drop-and-continue node devoted to multicast traffic distribution. Elements equivalent to those of FIG. 6 are denoted with the same reference numerals, with an added apex.

Similarly to the access node, the generic drop-and-continue node has an Ethernet flow domain ETH FDF' representing the packet switching functions on three different ports:

a port ETH_(T)FP WEST', for the ring connection on the west side;

a port ETH_(T)FP EAST', for the ring connection on the east side; and a port ETH_(T)FP_AP', which is the ideal service end point where the multicast content is delivered to the hypothetic customer (like a DSLAM).

The ports ETH_(T)FP WEST' and ETH_(T)FP EAST' connected to the network ring have a double, east/west path (from the port ETH_(T)FP WEST' to the port ETH_(T)FP EAST' and back again), in order to be able to forward the traffic to the next-hop (next network node) over the ring in either direction (west and east), and thus to perform the traffic "continue" function.

Inside the Ethernet flow domain ETH FDF', the connections for the traffic drop-and-continue function (forwarding processes) in downlink, and for the add-and-continue function in uplink are the following:

drop-and-continue function in downlink:
  the receiving side ETH_(T)FP WEST_i' of the port ETH_(T)FP WEST' (toward the Ethernet flow domain flow ETH FDF') is connected in broadcast (i.e., without the necessity of learning the MAC address) to the transmission side ETH_(T)FP EAST_e' of the port ETH_(T)FP EAST, and to the SAP Eth_ff_dl_in_W' of a sub-process Eth_ff_dl' of a protection process space PPS' of the drop-and-continue node;
  the receiving side ETH_(T)FP EAST_i' of the port ETH_(T)FP EAST' (toward the Ethernet flow domain flow ETH FDF') is connected in broadcast (i.e. without the necessity of learning the MAC address) to the transmission side ETH_(T)FP WEST_e' of the port ETH_(T)FP WEST, and to a SAP Eth_ff_dl_in_E' of a sub-process Eth_ff_dl';
  the sub-process ETH_ff_dl' of the protection process space PPS' receives data from the ports ET_(T)FP WEST' and ET_(T)FP EAST'; its output Eth_ff_dl_out' is connected to the transmission side of the service logical end point ETH_(T)FP AP' (from the flow domain flow ETH FDF' to external logical ports), where data flow after the selection based on the state of a control signal SSF_in' from a control module Switch_ctrl' intended to implement the protection algorithm;

add-and-continue function in uplink:
  the receiving side of the port ETH_(T)FP AP' (toward the Ethernet flow domain flow ETH FDF') is connected to an input ETH_ff_ul_in' of a sub-process ETH_FF_ul' of the protection process space PPS', having two outputs Eth_ff_ul_out_W' and Eth_ff_ul_out_E'; in operation, either the way from the input ETH_ff_ul_in' to the output Eth_ff_ul_out_W', or the way from the input ETH_ff_ul_in' to the output Eth_ff_ul_out_E' is enabled, depending on the state of the control signal SSF_in';
  the output Eth_ff_ul_out_W' of the sub-process ETH_FF_ul' is connected to the port ETH_(T)FP WEST', so that packets coming from the port ETH_(T)FP AP' are added to packets coming from the port ETH_(T)FP EAST' (if the control signal SSF_in' is in a state that enables this routing way);
  the output Eth_ff_ul_out_E' of the sub-process ETH_FF_ul' is connected to the port ETH_(T)FP EAST', so that packets coming from the port ETH_(T)FP AP' are added to packets coming from the port ETH_(T)FP WEST' (if the control signal SSF_in' is in a state that enables this way).

Similarly to the access node 105-1, the protection algorithm is schematized as a block denoted Switch_ctrl'; also, the protection process space PPS' may receive an external control signal Ext_cmd'.

The protection algorithm Switch_ctrl' at the generic, i-th drop-and-continue node (i=2, 3, 4 in the considered example) receives as inputs the following OAM alarm signals:

a CC alarm signal CC_Wi related to the west side of the network ring as seen by the considered drop-and-continue node;
  a CC alarm signal CC_Ei related to the east side of the network ring as seen by the considered drop-and-continue node;
  an AIS AIS_W related to the west side of the network ring;
  an AIS AIS_E related to the east side of the network ring;
  LOS alarm signals LOS from both the east port ETH_(T)FP EAST' and the west port ETH_(T)FP WEST'.

The generic drop-and-continue node 105-2, 105-3, 105-4 locally drops traffic received from the access node 105-1 directly, or from a preceding drop-and-continue node in the default traffic distribution direction, or, in case the access node 105-1 switched to one of the two protection modes, in the protection traffic distribution direction, and forwards it to the next node of the network ring along the default traffic distribution direction, or the protection traffic distribution direction. If the next node (next hop) in the network ring is the access node 105-1, the potential loop generated by traffic that flows along the ring and returns to the access node 105-1 is avoided by the access node protection mechanism described in the foregoing, that drops (discards) traffic returning from the protection route when the latter is not activated.

The protection algorithm Switch-ctrl' at the generic drop-and-continue node 105-2, 105-3, 105-4 differs from that of the access node 105-1, because the access node 105-1 receives as inputs and monitors all the CC alarm signals, from all the nodes in the network ring, whereas in the generic drop-and-continue node only the local CC alarm signals, for the west and east sides, are considered, i.e. the protection algorithm in the generic drop-and-continue node monitors a subset of the alarms that are monitored by the protection algorithm of the access node. This means that the protection algorithm is the same in all drop-and-continue nodes of the ring, and, at the generic drop-and-continue node, only a switching (not a broadcasting) of the traffic distribution direction from west-side to east-side may take place in case of failure.

Figure 9:
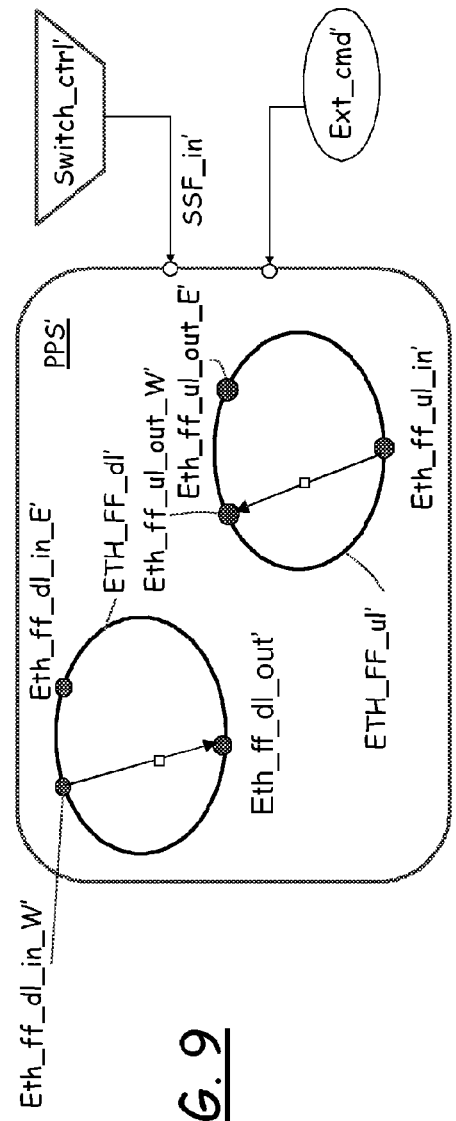
FIG. 9 schematically shows the operation of a protection mechanism implemented at the spoke Ethernet network node.

Similarly to FIG. 7, the protection process space PPS for the generic drop-and-continue node is depicted in FIG. 9. Similarly to FIG. 7, in FIG. 9 the drop-and-continue node is shown in a default operating condition, when the control signals SSF_in' and Ext_cmd' are in clear state (i.e., they are not asserted, for example at the low logic state L). The sub-processes ETH_FF_dl', for the downlink connection, and ETH_FF_ul', for the uplink connection, are switching processes reserved to the bidirectional connection.

In the following, processes useful to manage the multicast traffic over a network ring are described, according to an embodiment of the present invention.

Protection Mechanisms at the Access Node

Figure 10:
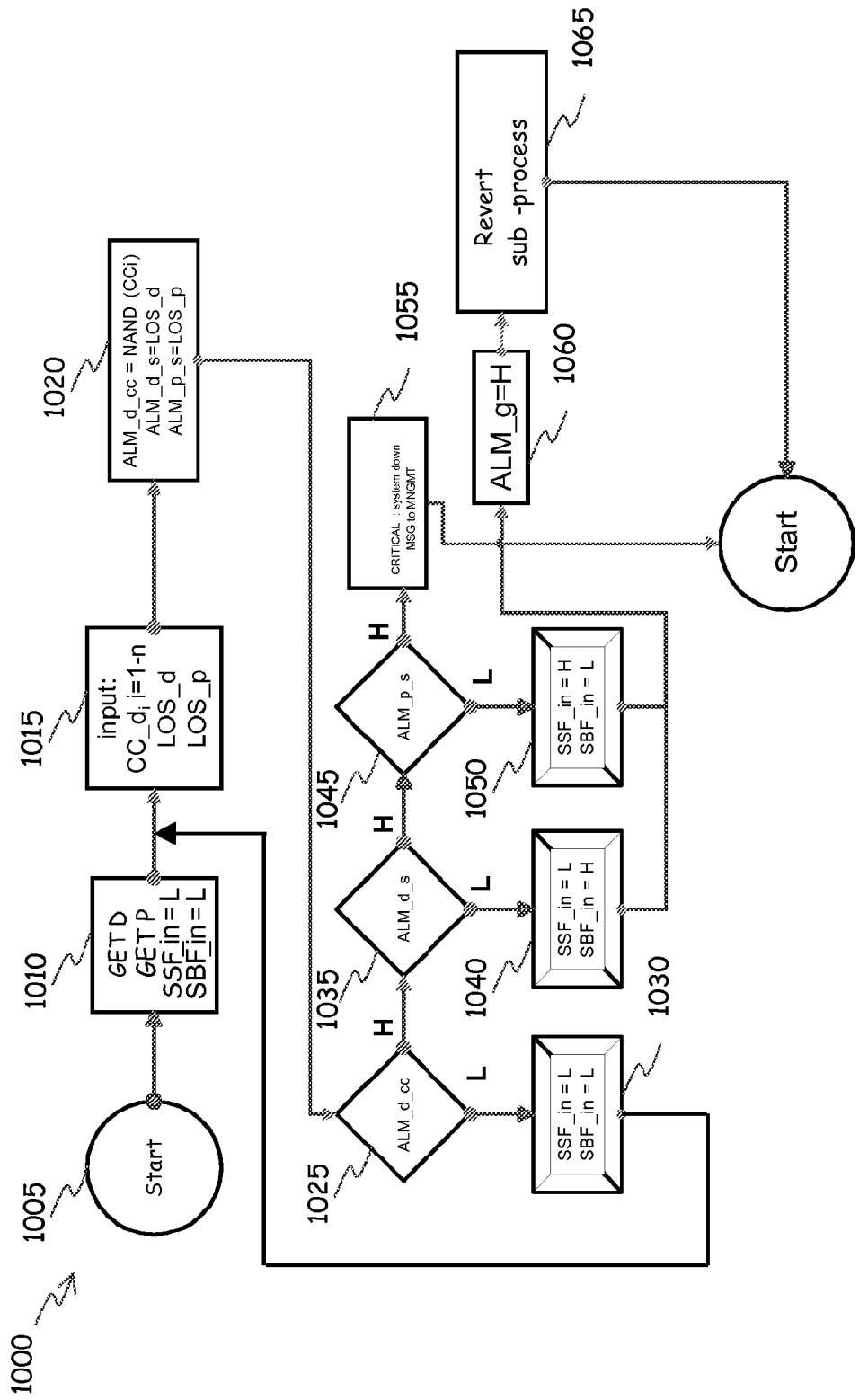
FIGS. 10 and 11 are schematic flowcharts illustrating some of the steps of the protection mechanism implemented at the hub Ethernet network node.
Figure 11:
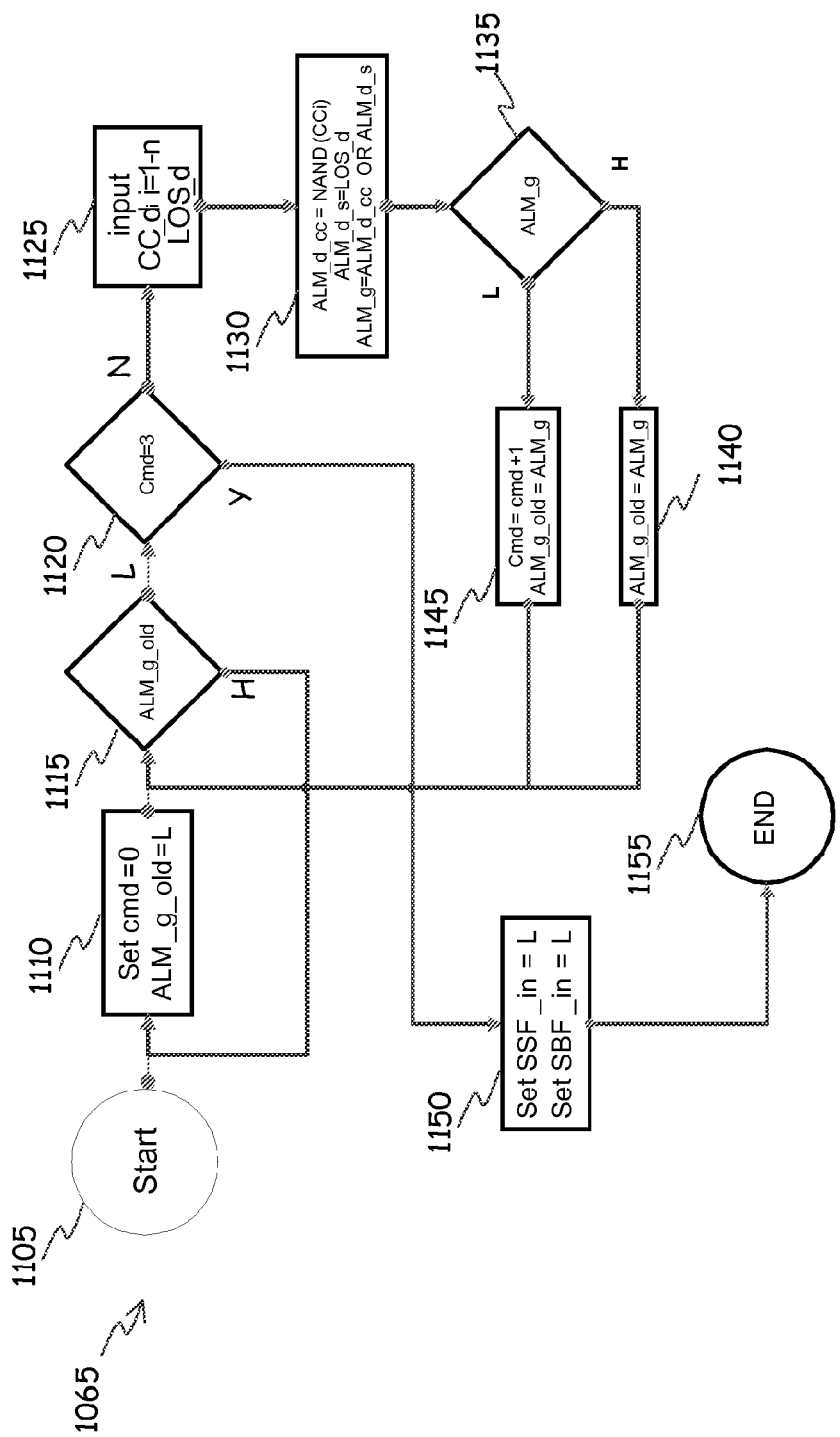

Two main sub-routines 1000 and 1100 of the protection algorithm executed in the access node 105-1 are depicted in FIGS. 10 and 11.

Considering the sub-routine 1000 depicted in FIG. 10, after it is started (block 1005), an initialization procedure is performed. In the initialization procedure, two "get" operations are performed in order to retrieve, from the Ethernet equipment's status registers, the states of default and protection traffic routing directions (west or east sides of the network ring) (block 1010). A variable "D" is used to store the value indicating the default traffic routing, and a variable "P" is used to store the value indicating the protection traffic routing; each of these variables may be assigned values WEST or EAST: when the variable D is assigned the value WEST (default routing is assumed to be along the west side), the variable P is assigned the value EAST (protection routing in case of failures is along the east side). Control signals SSF_in and SBF_in are set to the low logic state.

After completion of the initialization procedure, the current state of the various alarm signals is retrieved, in order to determine the proper state for the control signals SSF_in and SBF_in (block 1015). In particular, the following alarm indications are collected:

CC_di: continuity check on default side inside the equipment (if the equipment is the access node 105-1, it receives, at the west and east side ports, a number of CC signals equal to the number of nodes in the ring);
LOS_d: LOS on default side;
CC_pi: continuity check on protection side;
LOS_p: LOS on protection side.

Only the CC indications at the default side will be effectively used, because in order to determine the necessity of passing from the default (normal) operating mode to the switch mode or to the broadcast mode, only the default working side is significant.

The retrieved state (raised or clear) of the alarms is passed to a process (block 1020) that calculates the values of the following variables:

ALM_d_cc: alarm status on default traffic distribution side that indicates failures occurring between drop-and-continue nodes and triggers the broadcast distribution over the two ring sides;
ALM_d_s: alarm status on default traffic distribution side that indicates failures occurring on the active link or in the drop-and-continue node directly connected to the access node and triggers the switch-over distribution on the protection ring side;
ALM_p_s: alarm status on protection traffic distribution side that indicates the possibility of activating the alternative (protection) traffic distribution path.

In other words, the access node 105-1 constantly monitors the presence of faults on both the default and the protection traffic distribution paths.

In particular, the value of the variable ALM_d_cc is calculated as the logic NAND of the states of the retrieved CC signals; the value of the variable ALM_d_s is set equal to the state of the LOS signal LOS_d on the default side alarm signal; the value of the variable ALM_p_s is set equal to the state of the LOS signal LOS_p on the protection side alarm signal.

Table 2 below reports the truth table of the variable ALM_d_cc for the different possible states of two CC signals CC1_d and CC2_d; when the state of the variable ALM_d_cc is low (exit branch L of decision block 1025), both of the control signals SSF_in and SBF_in are kept de-asserted (block 1030), and normal operation takes place (the access node distributes the multicast traffic in the default direction, in the present example on the west side). The process jumps back to block 1015.

TABLE 2

| CC1_d | CC2_d | ALM_d_cc |
|-------|-------|----------|
| L | L | H |
| L | H | H |
| H | L | H |
| H | H | L |

When the value of the variable ALM_d_cc raises to the high logic state H, because at least one CC alarm signal on the default side is asserted (exit branch H of decision block 1025), two situations are possible.

If no LOS alarm signal on the default traffic distribution route is received by the access node 105-1, i.e. the value of the variable ALM_d_s is low (exit branch L of decision block 1035), this means that the network ring is not operational between at least one pair of drop-and-continue nodes, but it is operational on the link directly connected to the access node. In this condition, the control signal SBF_in is set to H, while the control signal SSF_in is kept de-asserted (block 1040); the access node thus starts distributing the multicast traffic over the two, west and east ring sides (broadcast mode) to overcome the failure.

If instead a LOS alarm signal is also received on default ring side (exit branch H of decision block 1035), it is necessary to check whether the alternative (protection) path is operational before switching the transmission of data over the protection path. To this purpose, the value of the variable ALM_p_s is checked (decision block 1045): if no LOS alarm signal has been received on the protection side (i.e., the value of the variable ALM_p_s is L, exit branch L of decision block 1045), the control signal SSF_in is set to H, while the control signal SBF_in is kept de-asserted (block 1050); in this way, the access node 105-1 starts re-routing the traffic on the protection path. If instead a LOS alarm signal is received also on protection side (exit branch H of decision block 1045), it is not possible to distribute traffic on the network ring, because a double failure exists. An asynchronous message may be sent to the management layer (block 1055), describing the critical network condition.

As a consequence of the setting of control signal SBF_in or SSF_in to the logic state H, a global alarm signal variable ALM_g is set to H, to indicate that the access node has entered the switch mode or the broadcast mode (block 1060).

After setting the global alarm signal variable ALM_g to H, a sub-routine 1165 (revert sub-routine) is invoked that is responsible of controlling the conditions for reverting to the normal operation mode, after the fault that caused the access node to enter switch mode or broadcast mode has been removed.

FIG. 11 represents the main steps of the revert sub-routine 1165.

After the revert sub-routine is started (block 1105), an integer variable cmd is set to zero and a logic variable ALM_g_old is set to L (block 1110); the variable cmd is used as a counter to check when the value of the variable ALM_g is clear (L) for a predetermined number of times, e.g. three times: when this condition is met, the control signals SSF_in and SBF_in are reset to L and the access node 105-1 switches back to the default traffic distribution route.

The values of the variables ALM_g_old and cmd are then assessed (decision blocks 1115 and 1120); in particular, it is assessed whether the value of the variable cmd is equal to a predetermined value (in the example, 3).

At the first iteration, the value of the variable ALM_g_old is L (exit branch L of decision block 1115), and the value of the variable cmd is zero (exit branch N of decision block 1120).

Similarly to what done in the sub-routine of FIG. 10, the state of the alarm signals associated with the default traffic distribution route is determined: the current state of the various alarm signals is retrieved (block 1125), and, based on the retrieved current value of the alarm signals, the values of the variables ALM_d_cc, ALM_d_s and ALM_g are calculated, in the same way described before (block 1130).

If an alarm indication still remains raised, the currently calculated value of the variable ALM_g is set to H (exit branch H of decision block 1135); the currently calculated value of the variable ALMg is copied into the variable ALM_g_old (whose state is thus changed compared to the initial condition) (block 1140), and the operation flow jumps back to decision block 1115. At the next iteration, exit branch H of decision block 1115 is taken, and the operation flows continuously jumps back to the entrance of block 1110. If instead the currently calculated value of the variable ALM_g is L (exit branch L of decision block 1135), the current value of the variable ALM_g is copied into the variable ALM_g_old, and the value of the variable cmd is increased by one (block 1145). The operation flow jumps back to the entrance of decision block 1115.

Once the value of the variable cmd reaches the predetermined number, for example 3 (exit branch Y of decision block 1120), the control signals SSF_in and SBF_in are reset to L (block 1150), and the access node 105-1 re-starts forwarding traffic on the default traffic distribution route.

Once the revert sub-routine 1165 is completed (block 1155), the operation flow jumps back to the beginning of the sub-routine of FIG. 10, and the monitoring of the alarm conditions re-starts.

Protection Mechanism at the Generic Drop-and-Continue Node

Figure 12:
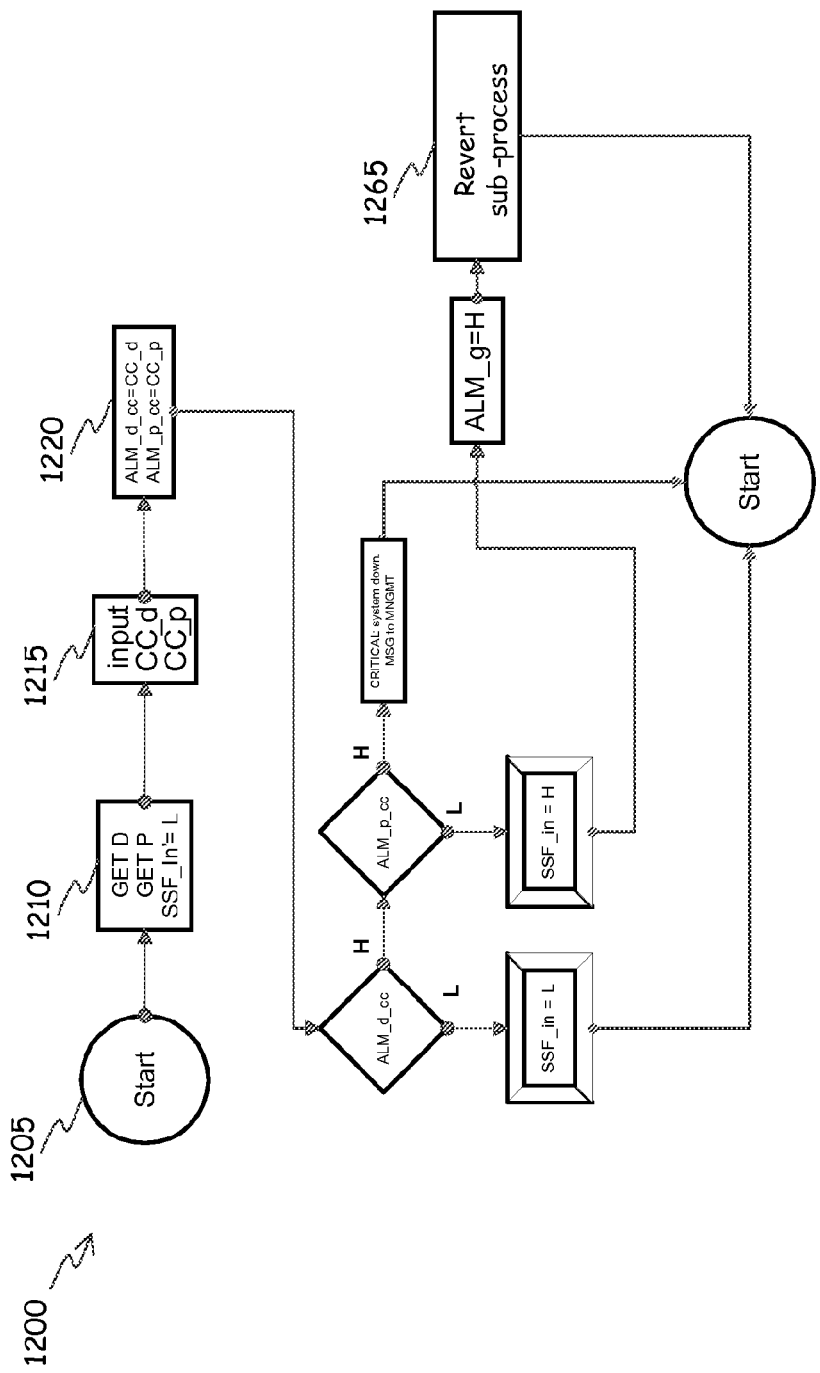
FIGS. 12 and 13 are schematic flowcharts illustrating some of the steps of the protection mechanism implemented at the spoke Ethernet network node.

The flowchart of FIG. 12 schematically shows the main steps of the protection algorithm implemented by the generic drop-and-continue node 105-2, 105-3, 105-4.

After the process is started (block 1205), an initialization procedure is conducted for retrieving the states of default and protection traffic routing from the equipment's state register (block 1210). In particular, during the initialization, two "get" operations are performed to retrieve, from Ethernet equipment's state registers, the states of default and protection routing, corresponding to the east or west sides of the network ring. A variable "D" is used to store the value indicating the default routing, and a variable "P" is used to store the value indicating the protection routing; each of these variables may be assigned values WEST or EAST: when the variable D is assigned the value WEST (default routing is along the west side), the variable P is assigned the value EAST (protection routing in case of failures is along the east side). The control signal SSF_in' is set to the low logic state.

After the initialization procedure, the system starts retrieving the current alarm signals' state, in order to calculate the value of the signal SSF_in (block 1215). In particular, the following alarm signals are retrieved:

CC_d: continuity check on the default side;
CC_p: continuity check on the protection side;

The retrieved data are passed to a process 1220 that calculates the values of the following variables:

ALM_d_cc: alarm status on the default side that signals failures occurring between the drop-and-continue node considered and the access node, and triggers the switch to the protection side;

ALM_p_cc: alarm status on the protection side that signals failures occurring between the drop-and-continue node considered and the access node, and allows switching to the protection side.

In particular, the value of the variable ALM_d_cc is set equal to the state of the continuity check alarm signal on the default side, whereas the value of the variable ALM_p_cc is set equal to the state of the continuity check alarm signal on the protection side.

Differently from the protection process running in the access node 105-1, the generic drop-and-continue node 105-2, 105-3, 105-4 monitors just one CC signal related to the west side and one CC signal related to the east side of the network ring in order to evaluate the switch over status.

The remaining operations performed by the drop-and-continue node are essentially the same as those already described for the access node. A revert sub-routine 1265 is invoked when the variable ALM_d_cc is set to L for deciding when it is possible to revert to the normal (default) operating mode.

Figure 13:
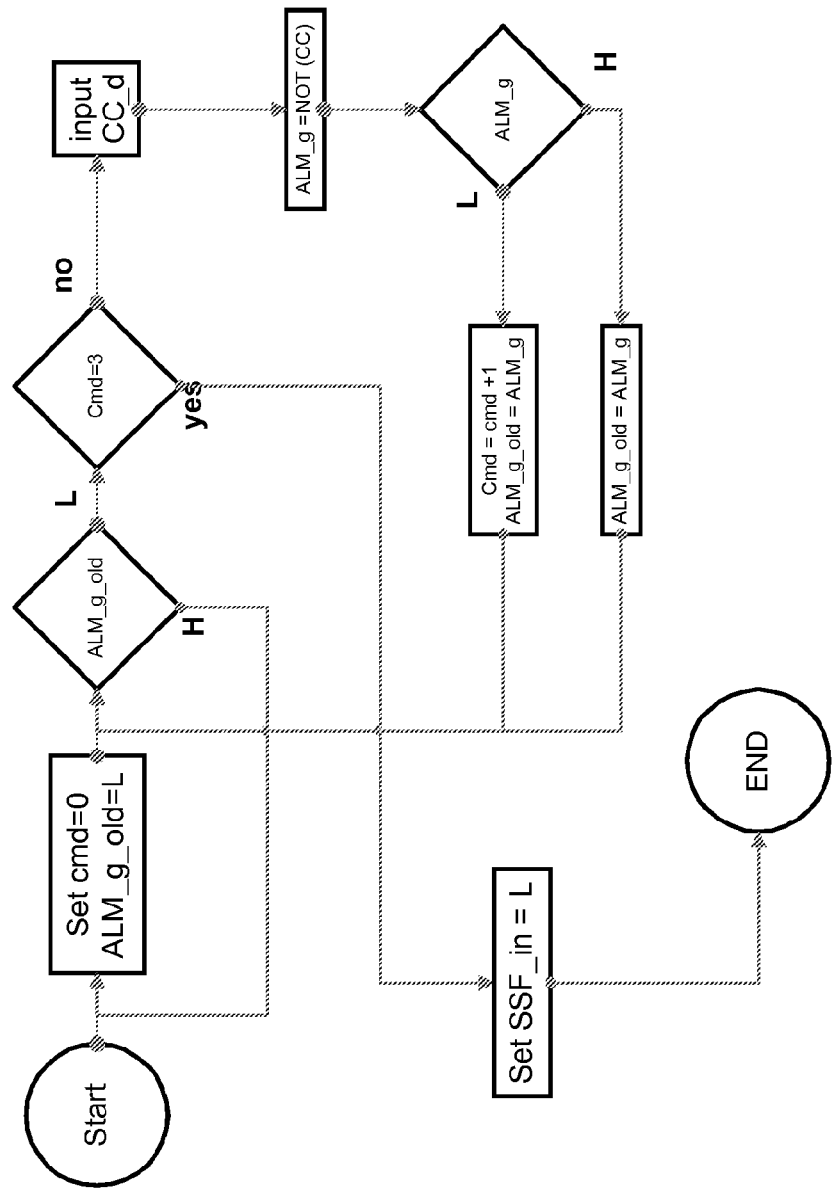

The flowchart of FIG. 13 schematically shows the main steps of the revert sub-routine 1265. The actions performed are essentially the same as those already described for the access node; a difference resides in that the drop-and-continue node retrieves just the CC_d alarm signal in order to define the switch back condition.

Thanks to the described solution, the switch-over time from the normal operation to the protection operation can be substantially reduced, to few tens of milliseconds, because the ports switchover operation is established in advance, both at the access node and at the drop-and-continue nodes, and it is not necessary to look at the MAC addresses.

As mentioned in the foregoing, the applicability of the present invention is not limited to networks having an Ethernet physical transport infrastructure, applying as well to other types of transport infrastructures, for example optical, like WDMs transport infrastructures, and more generally to any transport infrastructure. In general, the present invention is applicable in networks having a point-to-point layer 2, similar to the Ethernet layer 2, such as the MPLS (Multi Protocol Label Switching).

The invention claimed is:

1. A method of delivering multicast data traffic over a communication network comprising a first network node adapted in operation to deliver multicast data traffic to at least two second network nodes and wherein the first and second network nodes are connected to each other by a transmission network in a ring architecture and implement a point-to-multipoint layer 2 protocol, the method comprising:
at the first network node:
collecting alarm signals indicative of a failure condition of the transmission network along the whole ring and of the at least two second network nodes, and
based on a current state of the alarm signals:
delivering the multicast data traffic in a first delivery direction along the ring when no fault is detected;
delivering the multicast data traffic in a second delivery direction along the ring opposite to the first delivery direction if the collected alarm signals indicate a failure condition of a first type, wherein the failure condition of the first type comprises at least one of: a failure of a network node directly connected to the first network node and a failure of a portion of the transmission network between the first network node and the network node directly connected to the first network node; and
delivering the multicast data traffic in both the first and second delivery directions along the ring if the collected alarm signals indicate a failure condition of a second type different from the first type, wherein the failure condition of the second type comprises at least one of: a failure of a network node not directly connected to the first network node and a failure of a portion of the transmission network not directly connected to the first network node;
at each of the at least two second network nodes:
collecting local alarm signals indicative of a failure condition of the transmission network locally to the second network node and of the second network node, and based on a current state of the local alarm signals:
    either receiving the multicast data traffic delivered by the first network node from the first delivery direction along the ring, forwarding the multicast data traffic in the first delivery direction along the ring, and transmitting local data traffic to the first network node along the second delivery direction,
    or receiving the data traffic delivered by the first network node from the second delivery direction along the ring, forwarding the multicast data traffic in the second delivery direction along the ring, and transmitting the local data traffic to the first network node along the first delivery direction along the ring.

2. The method of claim 1, wherein said network nodes are Ethernet network nodes.

3. The method of claim 2, wherein said local alarm signals collected by each of the at least two second network nodes include:
    continuity check alarm signals related to first and second Ethernet flow points, wherein the first Ethernet flow point is configured to receive the multicast data traffic delivered by the first network node from the first delivery direction and to transmit local data traffic to the first network node along the second delivery direction, and the second Ethernet flow point is configured to receive the multicast data traffic delivered by the first network node from the second delivery direction and to transmit local data traffic to the first network node along the first delivery direction; and
    alarm indication signals related to the first and second Ethernet flow points.

4. The method of claim 3, wherein said alarm signals collected by the first network node include:
    continuity check alarm signals related to the first and the second Ethernet flow points of each of the at least two second network nodes; and
    alarm indication signals related to the first and second Ethernet flow points of each of the at least two second network nodes.

5. The method of claim 4, wherein said alarm indication signals are Loss Of Signal alarm indications.

6. The method of claim 5, wherein the first network node:
    delivers the multicast data traffic in the first delivery direction in case no continuity check alarm signal is asserted;
    delivers the multicast data traffic in the second delivery direction in case at least one continuity check alarm signal is asserted, at least one alarm indication signal related to the first Ethernet flow point of one of the at least two second network nodes is asserted, and no alarm indication signal related to the second Ethernet flow point of one of the at least two second network nodes is asserted;
    delivers the multicast data traffic in both the first and second delivery directions along the ring in case at least one continuity check alarm signal is asserted, and no alarm indication signal related to the first Ethernet flow point of one of the at least two second network nodes is asserted.

7. The method of claim 1, wherein the first network node returns to deliver the multicast data traffic in the first delivery direction after said alarm signals are deasserted, and each of the at least two second network nodes returns to receive the multicast data traffic delivered by the first network node from the first delivery direction along the ring, forward the multicast data traffic in the first delivery direction along the ring, and transmit local data traffic to the first network node along the second delivery direction after said local alarm signals are deasserted.

8. The method of claim 1, wherein the network node directly connected to the first network node and the transmission network between the first network node and the network node directly connected to the first network node are along the first delivery direction.

9. The method of claim 1, wherein the failure condition of the second type comprises at least one of: a failure of a network node not directly connected to the first network node and a failure of a portion of the transmission network not directly connected to the first network node.

10. The method of claim 9, wherein a first of the at least two second network nodes is the network node not directly connected to the first network node, and wherein the portion of the transmission network not directly connected to the first network node is a portion of the transmission network between the first of the at least two second network nodes and a second of the at least two second network nodes.

11. A hub network node adapted to deliver multicast data traffic over a communication network comprising the hub network node and at least two spoke network nodes and a transmission network connecting the hub and spoke network nodes in a ring architecture, and wherein the hub network node and the spoke network nodes implement a point-to-multipoint layer 2 protocol, the hub network node comprising a multicast traffic delivery protection function adapted to:
    collect alarm signals indicative of a failure condition of the transmission network along the whole ring and of the at least two spoke network nodes, and
    based on a current state of the alarm signals, cause the delivery of the multicast data traffic:
        in a first delivery direction along the ring when no fault is detected;
        in a second delivery direction along the ring opposite to the first delivery direction if the collected alarm signals indicate a failure condition of a first type, wherein the failure condition of the first type comprises at least one of: a failure of a network node directly connected to the first network node and a failure of a portion of the transmission network between the first network node and the network node directly connected to the first network node; and
        in both the first and second delivery directions along the ring if the collected alarm signals indicate a failure condition of a second type different from the first type, wherein the failure condition of the second type comprises at least one of: a failure of a network node not directly connected to the hub network node and a failure of a portion of the transmission network not directly connected to the hub network node.

12. The hub network node of claim 11, wherein said hub network node and said at least two spoke network nodes are Ethernet network nodes, and wherein said alarm signals include:
    continuity check alarm signals related to first and second Ethernet flow points of each of the at least two spoke network nodes, wherein the first Ethernet flow point is configured to receive the multicast data traffic delivered by the hub network node from the first delivery direction and to transmit local data traffic to the hub network node along the second delivery direction, and the second Ethernet flow point is configured to receive the multicast data traffic delivered by the hub network node from the second delivery direction and to transmit local data traffic to the hub network node along the first delivery direction; and alarm indication signals related to the first and second Ethernet flow points of each of the at least two spoke network nodes.

13. The hub network node of claim 12, wherein said alarm indication signals are Loss Of Signal alarm indications.

14. The hub network node of claim 11, adapted to:

deliver the multicast data traffic in the first delivery direction in case no continuity check alarm signal is asserted;

deliver the multicast data traffic in the second delivery direction in case at least one continuity check alarm signal is asserted, at least one alarm indication signal related to a first Ethernet flow point of one of the at least two spoke network nodes is asserted, and no alarm indication signal related to a second Ethernet flow point of one of the at least two spoke network nodes is asserted;

deliver the multicast data traffic in both the first and second delivery directions along the ring in case at least one continuity check alarm signal is asserted, and no alarm indication signal related to the first Ethernet flow point of one of the at least two spoke network nodes is asserted.

15. The hub network node of claim 11, adapted to return to deliver the multicast data traffic in the first delivery direction after said alarm signals are deasserted.

16. A spoke network node adapted to receive multicast data traffic delivered by a hub network node connected to the spoke network by a transmission network in a ring architecture, and wherein the spoke network node implements a point-to-multipoint layer 2 protocol, the spoke network node comprising a multicast traffic delivery protection function adapted to:

collect local alarm signals indicative of a failure condition of the transmission network locally to the spoke network node and of the spoke network node, transmit, to the hub network node, a message indicating the collected local alarm signals, wherein the message is configured to cause the hub network node to deliver the multicast data traffic in a second delivery direction if the message indicates a failure condition of a first type, wherein the failure condition of the first type comprises at least one of: a failure of a network node directly connected to the first network node and a failure of a portion of the transmission network between the first network node and the network node directly connected to the first network node;

and to deliver the multicast data traffic in both the second direction and a first delivery direction along the ring opposite to the second delivery direction if the message indicates a failure condition of a second type different from the first type, wherein the failure condition of the second type comprises at least one of: a failure of a network node not directly connected to the hub network node and a failure of a portion of the transmission network not directly connected to the hub network node; and based on a current state of the local alarm signals:

either receiving the multicast data traffic delivered by the first network node from the first delivery direction along the ring, forwarding the multicast data traffic in the first delivery direction along the ring, and transmitting local data traffic to the first network node along the second delivery direction, or receiving the data traffic delivered by the first network node from the second delivery direction along the ring, forwarding the multicast data traffic in the second delivery direction along the ring, and transmitting the local data traffic to the first network node along the first delivery direction along the ring.

17. The spoke network node of claim 16, wherein the spoke network node is an Ethernet node, and wherein said local alarm signals collected by the spoke network node include:

continuity check alarm signals related to a first and a second Ethernet flow points, wherein the first Ethernet flow point is configured to receive the multicast data traffic delivered by the hub network node from the first delivery direction and to transmit local data traffic to the hub network node along the second delivery direction, and the second Ethernet flow point is configured to receive the multicast data traffic delivered by the hub network node from the second delivery direction and to transmit local data traffic to the hub network node along the first delivery direction; and alarm indication signals related to the first and second Ethernet flow points.

18. The spoke network node of claim 17, adapted to return to receive the multicast data traffic delivered by the hub network node from the first delivery direction along the ring, forward the multicast data traffic in the first delivery direction along the ring, and transmit local data traffic to the hub network node along the second delivery direction after said local alarm signals are deasserted.

19. A communication network comprising:

a first network node;

at least two second network nodes;

a transmission network connecting the first and second network nodes in a ring architecture;

wherein:

the first network node is adapted to deliver multicast data traffic over the communication network, and wherein the first network node and the at least two second network nodes implement a point-to-multipoint layer 2 protocol, the first network node including a multicast traffic delivery protection function adapted to:

collect alarm signals indicative of a failure condition of the transmission network along the whole ring and of the at least two second network nodes, and based on a current state of the alarm signals:

cause the delivery of the multicast data traffic in a first delivery direction along the ring when no fault is detected;

delivering the multicast data traffic in a second delivery direction along the ring opposite to the first delivery direction if the collected alarm signals indicate a failure condition of a first type, wherein the failure condition of the first type comprises at least one of: a failure of a network node directly connected to the first network node and a failure of a portion of the transmission network between the first network node and the network node directly connected to the first network node; and delivering the multicast data traffic in both the first and second delivery directions along the ring if the collected alarm signals indicate a failure condition of a second type different from the first type, wherein the failure condition of the second type comprises at least one of: a failure of a network node not directly connected to the first network node and a failure of a portion of the transmission network not directly connected to the first network node; and each of the second network nodes is adapted to receive multicast data traffic delivered by the first network node, each second network node including a multicast traffic delivery protection function adapted to:
- collect local alarm signals indicative of a failure condition of the transmission network locally to the second network node and of the second network node, and
- based on a current state of the local alarm signals:
  - either receiving the multicast data traffic delivered by the first network node from the first delivery direction along the ring, forwarding the multicast data traffic in the first delivery direction along the ring, and transmitting local data traffic to the first network node along the second delivery direction,
  - or receiving the data traffic delivered by the first network node from the second delivery direction along the ring, forwarding the multicast data traffic in the second delivery direction along the ring, and transmitting the local data traffic to the first network node along the first delivery direction along the ring.

* * * * *